(12) United States Patent
Kimura

(10) Patent No.: US 8,619,180 B2
(45) Date of Patent: Dec. 31, 2013

(54) FOCAL POINT ADJUSTING APPARATUS, IMAGE-TAKING APPARATUS, INTERCHANGEABLE LENS, CONVERSION COEFFICIENT CALIBRATING METHOD, AND CONVERSION COEFFICIENT CALIBRATING PROGRAM

(75) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 482 days.

(21) Appl. No.: 12/997,681

(22) PCT Filed: Jul. 15, 2009

(86) PCT No.: PCT/JP2009/003319
§ 371 (c)(1),
(2), (4) Date: Dec. 13, 2010

(87) PCT Pub. No.: WO2010/007772
PCT Pub. Date: Jan. 21, 2010

(65) Prior Publication Data
US 2011/0096171 A1    Apr. 28, 2011

(30) Foreign Application Priority Data
Jul. 15, 2008   (JP) ................................. 2008-184020

(51) Int. Cl.
*H04N 5/232* (2006.01)
*G03B 3/10* (2006.01)

(52) U.S. Cl.
USPC ........... 348/345; 348/348; 348/349; 348/350; 396/121; 396/122

(58) Field of Classification Search
USPC ................. 348/251, 326, 345, 349, 350, 356; 396/89, 121, 122, 128
See application file for complete search history.

(56) References Cited

U.S. PATENT DOCUMENTS

| 4,410,804 A | 10/1983 | Stauffer | |
| 5,367,153 A * | 11/1994 | Suda et al. | 250/201.8 |

(Continued)

FOREIGN PATENT DOCUMENTS

| CN | 1447102 A | 10/2003 |
| CN | 1450398 A | 10/2003 |
| EP | 0 069 938 A1 | 1/1983 |
| EP | 0 069 938 B1 | 4/1985 |

(Continued)

OTHER PUBLICATIONS

Oct. 13, 2009 International Search Report and Written Opinion in PCT/JP2009/003319.

(Continued)

*Primary Examiner* — Hung Lam
(74) *Attorney, Agent, or Firm* — Fitzpatrick, Cella, Harper & Scinto

(57) ABSTRACT

A focal point adjusting apparatus comprises: a photoelectric converting unit that photoelectrically converts at least a pair of optical images and outputs at least a pair of image signals; a phase difference detecting unit that detects the phase difference between the pair of image signals that is output by the photoelectric conversion unit; a conversion unit that carries out the conversion of a phase difference that is detected by the phase difference detecting unit into a defocus amount by using a conversion coefficient; a focal point moving unit that moves the focal point position based on the defocus amount resulting of the conversion by the conversion unit; and a calibrating unit that calibrates the conversion coefficient depending on the result of the focal point moving unit moving the focal point position when the operator photographs a subject.

14 Claims, 19 Drawing Sheets

(56) References Cited

U.S. PATENT DOCUMENTS

| | | | |
|---|---|---|---|
| 5,536,931 A | 7/1996 | Kusaka et al. | |
| 5,880,890 A * | 3/1999 | Furuta | 359/626 |
| 6,714,732 B2 | 3/2004 | Kanemitsu | |
| 6,941,068 B2 | 9/2005 | Matsuda | |
| 7,474,352 B2 * | 1/2009 | Oikawa | 348/349 |
| 8,538,187 B2 * | 9/2013 | Wang et al. | 382/255 |
| 2009/0202234 A1 * | 8/2009 | Ichimiya | 396/89 |
| 2009/0256952 A1 * | 10/2009 | Kusaka | 348/349 |
| 2010/0157094 A1 * | 6/2010 | Takamiya | 348/229.1 |
| 2011/0008031 A1 * | 1/2011 | Kusaka | 396/100 |

FOREIGN PATENT DOCUMENTS

| | | |
|---|---|---|
| JP | 58-24105 A | 2/1983 |
| JP | 61-18911 A | 1/1986 |
| JP | 7-318793 A | 12/1995 |
| JP | 2004-12493 A | 1/2004 |
| JP | 2007-121896 A | 5/2007 |

OTHER PUBLICATIONS

Office Action dated Jul. 2, 2012, in Chinese Patent Application No. 200980127274.4.

* cited by examiner

FOCAL POINT ADJUSTING APPARATUS, IMAGE-TAKING APPARATUS, INTERCHANGEABLE LENS, CONVERSION COEFFICIENT CALIBRATING METHOD, AND CONVERSION COEFFICIENT CALIBRATING PROGRAM

TECHNICAL FIELD

The present invention relates to a focal point adjusting apparatus for a digital camera and a video camera and the like, relates to an image-taking apparatus, interchangeable lens, a conversion coefficient calibrating method, and relates to a conversion coefficient calibrating program.

BACKGROUND ART

Accompanying increases in the performance of focal point detecting devices in recent years, many focal point detecting means have been proposed that can measure distance at multiple points in the field of view, which is termed multipoint ranging. In addition, phase difference AF is conventionally known as a means of focal point detection. In a focal point detecting means that carries out multipoint ranging by using the principle of phase difference AF, a pair of image signals, which are associated with the respective measured ranging points, is acquired, correlation computation is carried out, and a defocus amount is calculated from the phase difference.

As one method for detecting the focusing state of a camera lens, Japanese Patent Laid-Open No. S58-24105 discloses an apparatus that carries out focal point detection by a pupil-splitting method using a two-dimensional sensor in which a microlens is formed at each pixel of the sensor. The apparatus of Japanese Patent Laid-Open No. S58-24105 is structured such that photoelectric converting units for each of the pixels that form the sensor are spit into a plurality, and the partitioned photoelectric converting units receive light from different areas of the pupil of the camera lens. In addition, Japanese Patent Laid-Open No. S61-18911 discloses a focal point adjusting apparatus that carries out correction when what is termed "vignetting" occurs due to the camera lens. In Japanese Patent Laid-Open No. S61-18911, the illumination and the vignetting state of the lens are associated and stored, and a conversion coefficient, which converts an amount of blur to a defocus amount depending on the state of illumination of the lens while photographing, is corrected. Furthermore, Japanese Patent Laid-Open No. 2004-12493 discloses a focal point adjusting apparatus that calibrates a conversion coefficient that converts a blur amount to a defocusing amount. In Japanese Patent Laid-Open No. 2004-12493, before the operator takes a photograph, a calibration operation is carried out, and this value is stored in the camera. While photographing, the blur amount is converted to a defocus amount by using a calibrated conversion coefficient. Furthermore, Japanese Patent Laid-Open No. 2007-121896 discloses a focal point adjusting apparatus that calculates a conversion coefficient that converts a blur amount to a defocus amount while taking into consideration vignetting that is caused by the camera lens. In Japanese Patent Laid-Open No. 2007-121896, a conversion coefficient, which converts a blur amount to a defocus amount based on the profile of the focal point detection optical system and the aperture information of the camera lens system, is calculated.

CITATION LIST

Patent Literature

Japanese Patent Laid-Open No. S58-24105
Japanese Patent Laid-Open No. S61-18911
Japanese Patent Laid-Open No. 2004-12493
Japanese Patent Laid-Open No. 2007-121896

However, when an operator is operating a camera, in addition to the AF precision, the AF speed is also important for imparting a comfortable feel to the operation of the automatic focal point detection (below, referred to as "AF"). In order to improve the AF speed, the focusing state must be attained by as few AF operations as possible when performing AF in a defocused state. Specifically, it is desirable that the detected defocus amount be close to the actual defocus amount. Thus, because a defocus amount is detected as the blur amounts of a pair of images in what is termed "phase difference AF", which is disclosed in Patent Document 1, the conversion coefficient that converts a blur amount to a defocus amount must be correctly estimated. In contrast, when viewed from a point that is separated from the imaging optical axis at the focus detecting sensor, vignetting is caused by the camera lens. There are no problems when the vignetting caused by the camera lens can be correctly evaluated, but the vignetting cannot always be correctly estimated because of manufacturing errors or play in the apparatus or the like. In addition, in methods in which the operator carries out the calibration operation before photographing, there is a problem in that carrying out the calibration operation before photographing imposes a significant burden on the operator. Thus, there is a concern that the correct AF operation cannot be performed when the operator does not correctly perform the calibration operation.

SUMMARY OF INVENTION

The present invention provides an apparatus to enable the calibration of a conversion coefficient that converts a blur amount to a defocus amount without the operator being particularly aware of the calibration operation, even when vignetting occurs due to the optical system.

In order to solve the problems described above, an aspect of the present invention is a focal point adjusting apparatus that is provided with a photoelectric converting unit that photoelectrically converts at least a pair of optical images and outputs at least a pair of image signals; a phase difference detecting unit that detects the phase difference between the pair of image signals that is output by the photoelectric conversion unit; a conversion unit that carries out the conversion of a phase difference that is detected by the phase difference detecting unit into a defocus amount by using a conversion coefficient; a focal point moving unit that moves the focal point position based on the defocus amount resulting from the conversion by the conversion unit; and a calibrating unit that calibrates the conversion coefficient depending on the result of the focal point moving unit moving the focal point position when the operator photographs a subject.

According to the present invention, it is possible to carry out the calibration of the conversion coefficient, which converts a blur amount into a defocus amount, without the operator being particularly aware of the calibration operation. Thereby, an improvement in the AF speed can be realized, and the usability can be improved. Further features of the present invention will become apparent from the following description of exemplary embodiments with reference to the attached drawings.

DESCRIPTION OF EMBODIMENTS

Below, embodiments for practicing the present invention will be explained with reference to the drawings. Note that each of the drawings shown below is a schematic drawing, and the size and shape of each of the parts may be suitably emphasized in order to facilitate understanding. In addition, the following explanations are provided with specific numerical values, shapes, materials and operations and the like. However, these may be suitably modified. Furthermore, in a portion of the figures, in order to clarify the correspondences between each of the figures to facilitate understanding, an XYZ perpendicular coordinate system is provided in which, without particularly specifying an origin and only to indicate direction, the upward direction is the +Y direction when a camera is in a normal position. Here, the expression "normal position" denotes an orientation of the camera when the optical axis of the image-taking optical system (hereinbelow, simply referred to as the "optical axis") of the image-taking lens 5 is horizontal, and the longitudinal direction of the photographed image is horizontal. Below, the +Y direction is upward, and the +Z direction (that is, the direction of the optical axis toward the subject) is forward.

Example 1

Figure 1:
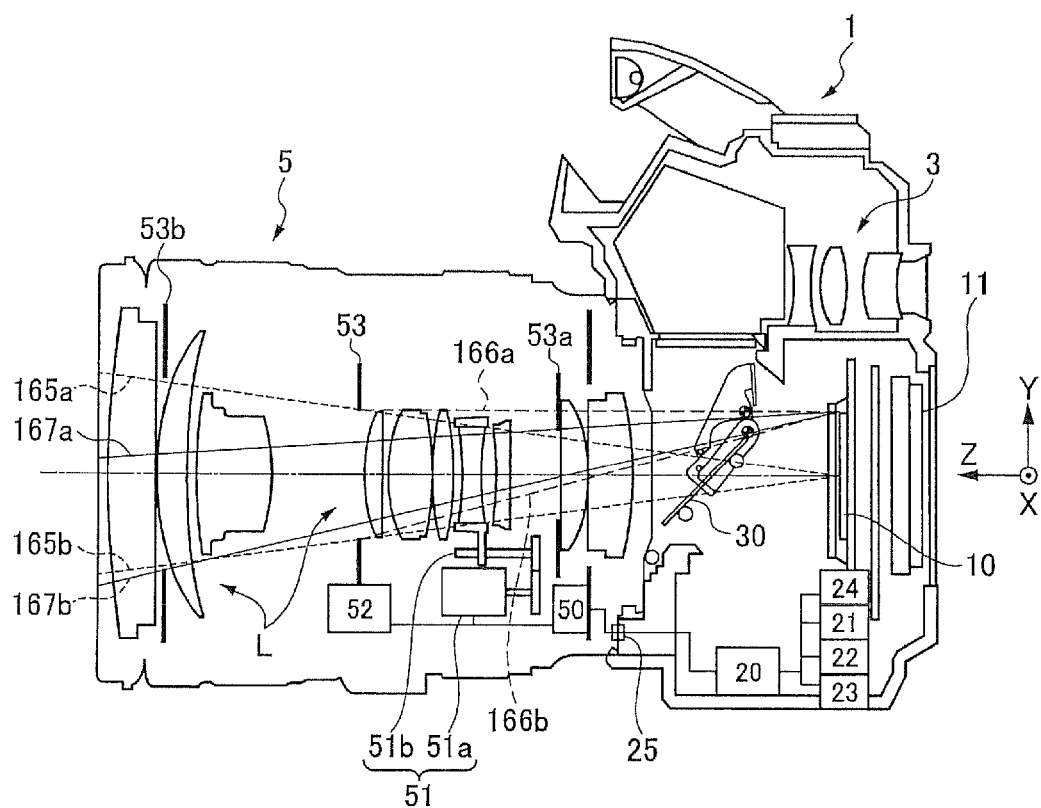
FIG. 1 is a cross-sectional view that shows a first embodiment of a camera that includes the focal point adjusting apparatus according to the present invention.
Figure 2:
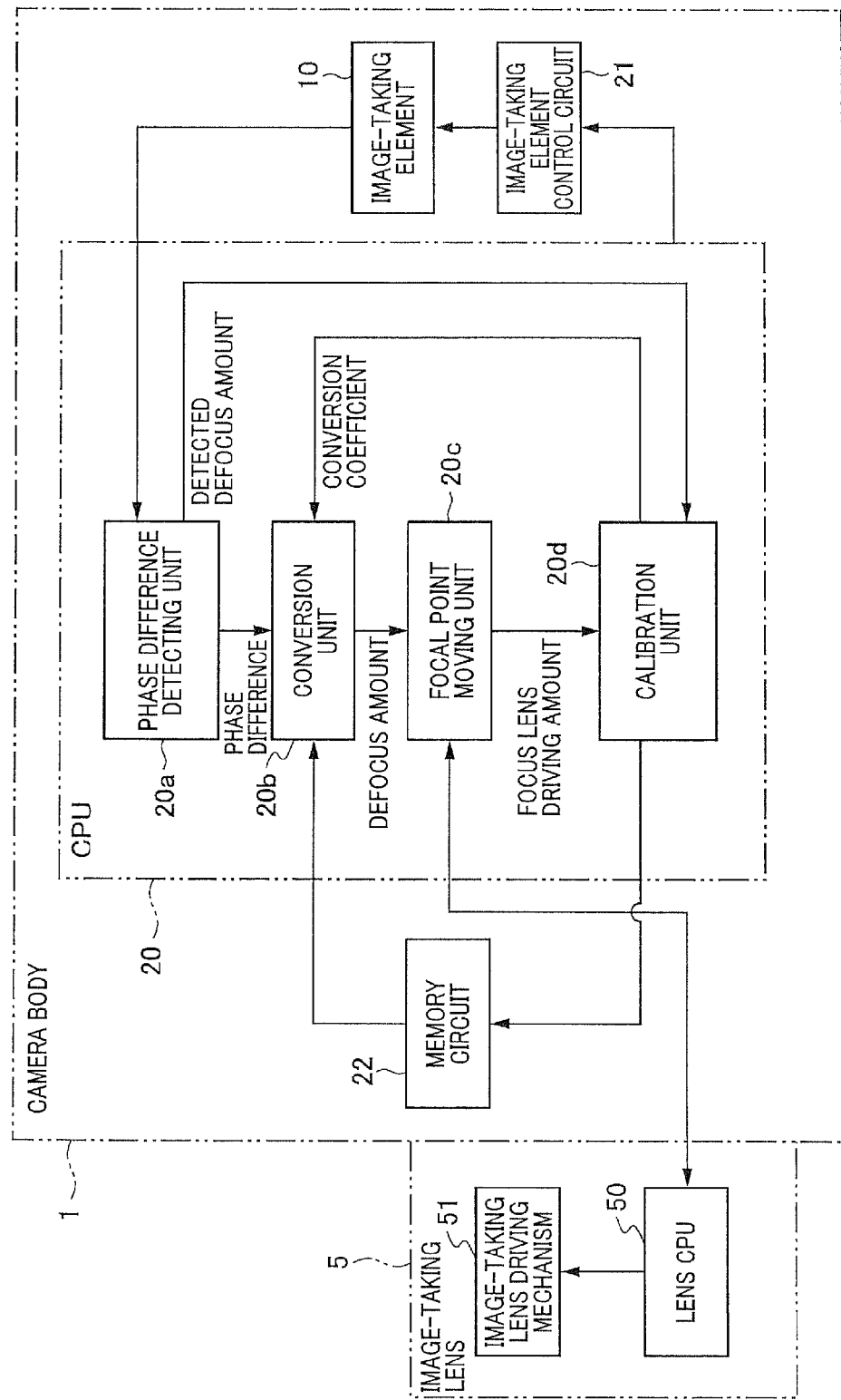
FIG. 2 is a functional block diagram of the portion related to the focus adjustment of the camera of the first embodiment.

FIG. 1 is a cross-sectional drawing that shows a first embodiment of a camera that incorporates the focal point adjusting apparatus according to the present invention. FIG. 2 is a functional block diagram of the portion that is related to the focus adjustment of the camera of the first embodiment. The camera of the present embodiment is an interchangeable lens-type digital camera that is used by combining viewfinder 3, a camera body 1 that includes an image-taking element 10, and an image-taking lens 5 that includes an image-taking optical system L. The camera body 1 is provided with a viewfinder 3, an image-taking element 10, a display 11, a CPU 20, an image-taking element control circuit 21, a memory circuit 22, an interface circuit 23, an image processing unit 24, electrical contact 25, and a reflex mirror 30.

The viewfinder 3 is disposed on the +Y side of the camera body 1, and enables the operator to view the subject image that is reflected by the reflex mirror 30. The image-taking element is formed by a CMOS (Complementary Metal Oxide Semiconductor) image sensor or a CDD (Charge Coupled Device) image sensor or the like. The image-taking element 10 is disposed at the expected image formation plane of the image-taking lens 5 of the camera body 1. The details of the image-taking element 10 will be described below. The display 11 is formed by an LCD (Liquid Crystal Display) panel or the like, and displays the photographed image and information, such as information about the photograph and the like. In addition, while in the live-view mode, the display 11 displays a real time moving image of the field that is to be photographed. Here, the term "live-view mode" denotes a mode in which the subject image from the image-taking lens 5 is captured by the image-taking element 10, and a low-resolution preview moving image is displayed in the display 11 in real time. While in the live preview mode, phase difference AF in the imaging plane described below is performed.

The CPU 20 is a control unit that carries out overall control of the camera body. In addition, the CPU 20 is provided with a phase difference detecting unit 20a, a converting unit 20b, a focal point moving unit 20c, and a calibration unit 20d. The CPU 20 also carries out the calculation of the focusing state of the image-taking lens 5, the drive commands, and the calibration of the conversion coefficient. The phase difference detecting unit 20a detects the phase difference between a pair of image signals that have been obtained from the focal point detecting pixels (to be described below) that are included in the image-taking element 10. The conversion unit 20b converts the phase difference that has been detected by the phase difference detecting unit 20a to a defocus amount by using the conversion coefficient described below. The focal point moving unit 20c directs the lens CPU 50 so that the focal point position is moved based on the defocus amount resulting from the conversion by the conversion unit 20b. The calibration unit 20d compares the amount of movement of the expected focal point position and the amount of movement of the actual focal point position when the focal point moving unit 20c moves the focal point position, and calibrates this conversion coefficient according to the results of this comparison. In addition, the calibration unit 20d transmits the calibrated conversion coefficient to the conversion unit 20b, and stores the calibrated conversion coefficient in the memory circuit 22. The portion that carries out the calculation of the focusing state, the drive commands, and the calibration of the conversion coefficient forms the principal constituent of the focal point adjusting apparatus in the camera of the present embodiment. The operation of this portion as a focal point adjusting apparatus will be explained below in detail.

The image-taking element control circuit 21 carries out the drive control of the image-taking element 10 according to the commands of the CPU 20. The memory circuit 22 is a storing unit that stores the images that have been captured by the image-taking element 10. In addition, the received light distribution of the image-taking element 10 and the conversion coefficient, which is described below, are stored in the memory circuit 22. The interface circuit 23 outputs the image that has undergone image processing by the image processing unit 24 to the outside of the camera. The image processing unit 24 carries out image processing of the image signals that have been captured by the image-taking element 10. The electrical contact 25 is brought into contact with the electrical contact 54 of the image-taking lens 5 and is used for power supply and for the communication of various types of signal. The reflex mirror 30 reflects the captured light flux from the image-taking lens 5 toward the viewfinder 3. In addition, the reflex lens 30 retracts in the +Y direction while photographing or while in the live-view mode to enable the captured light flux from the image-taking lens 5 to reach the image-taking element 10. Although not illustrated, a shutter is provided between the −Z side of the reflex mirror 30 and the +Z side of the image-taking element 10. The shutter is open while photographing and when in the live-view mode.

The image-taking lens 5 is an interchangeable lens that is freely detachable from the camera body 1. The image-taking lens 5 is provided with an image-taking optical system L, a lens CPU 50, an image-taking lens driving mechanism 51, a diaphragm drive mechanism 52, a diaphragm 53, and an electrical contact point 54. The image-taking optical system L forms an optical image of the photographed subject on the image-taking element 10. The image-taking optical system L consists of a group of lenses, and it is driven by the image-taking lens driving mechanism 51 such that the focal point position, which is in proximity to the imaging plane of the image-taking element 10, is moved along the Z direction. The lens CPU 50 receives the focus adjustment information that is sent from the CPU 20 of the camera body 1 via the electrical contact 26, and drives the image-taking lens driving mechanism 51 based on this focus adjustment information. The image-taking lens driving mechanism 51 includes a focus motor 51a and a drive power converting mechanism 51b that converts a rotating movement to a rectilinear movement, and drives a focus lens group that is included in the image-taking optical system L. For example, a mechanism that combines a lead screw and a nut, or a cam mechanism that combines a yoke cam and a cam follower or the like, can be used as the drive power converting mechanism 51b. The diaphragm driving mechanism 52 includes a mechanism that drives the diaphragm 53 and an actuator therefor, and the diaphragm 53 is driven according to the commands of the lens CPU 50. The diaphragm 53 includes, for example, an iris arranged in proximity to the pupil of the image-taking lens 5, and is narrowed to a predetermined aperture value by the diaphragm driving mechanism 52. The electrical contact 54 is brought into contact with the electrical contact 25 of the camera body 1, and this is used for power and the communication of various types of signal.

In addition, FIG. 1 shows the window frame 53a and the window frame 53b. The window frame 53a is a window frame that is provided so as to be closer to the image-taking element 10 (on the −Z side) than the diaphragm 53. The window frame 53b is a window frame that is provided so as to be farther from the image-taking element 10 (on the +Z side) than the diaphragm 53. Here, a window frame is a light-blocking frame that delimits an area in which the subject light undergoes vignetting due to the holding frame members that hold each of the lenses that form the image-taking optical system L. Furthermore, FIG. 1 shows the light rays 165a and b, light rays 166a and b, and light rays 167a and b. The light rays 165a and b are directed from the center of the image-pickup element 10 toward the diaphragm 53. The light rays 166a and b are directed from the point, where an image height exists, on the image-pickup element in the Y direction toward the diaphragm 53. Among the light flux that is incident to the point, where the image height exists, on an image-taking element in the Y direction, the light rays 167a and b are delimited by the window frames. In the example of the embodiment that is shown in FIG. 1, the light rays are not subject to vignetting at the center of the image-pickup element 10 due to the window frames 53a and 53b. However, at a position where the image height is high, the light rays at the top and the bottom of the window frames 53a and 53b may be subject to vignetting because the window frames 53a and 53b extend more inward than the light rays directed toward the diaphragm 53. In the example in FIG. 1, the light rays in the +Y direction are delimited by the window frame 53a, and the light rays in the −Y direction are delimited by the window frame 53b. The influence of the vignetting will be explained below.

Figure 3:
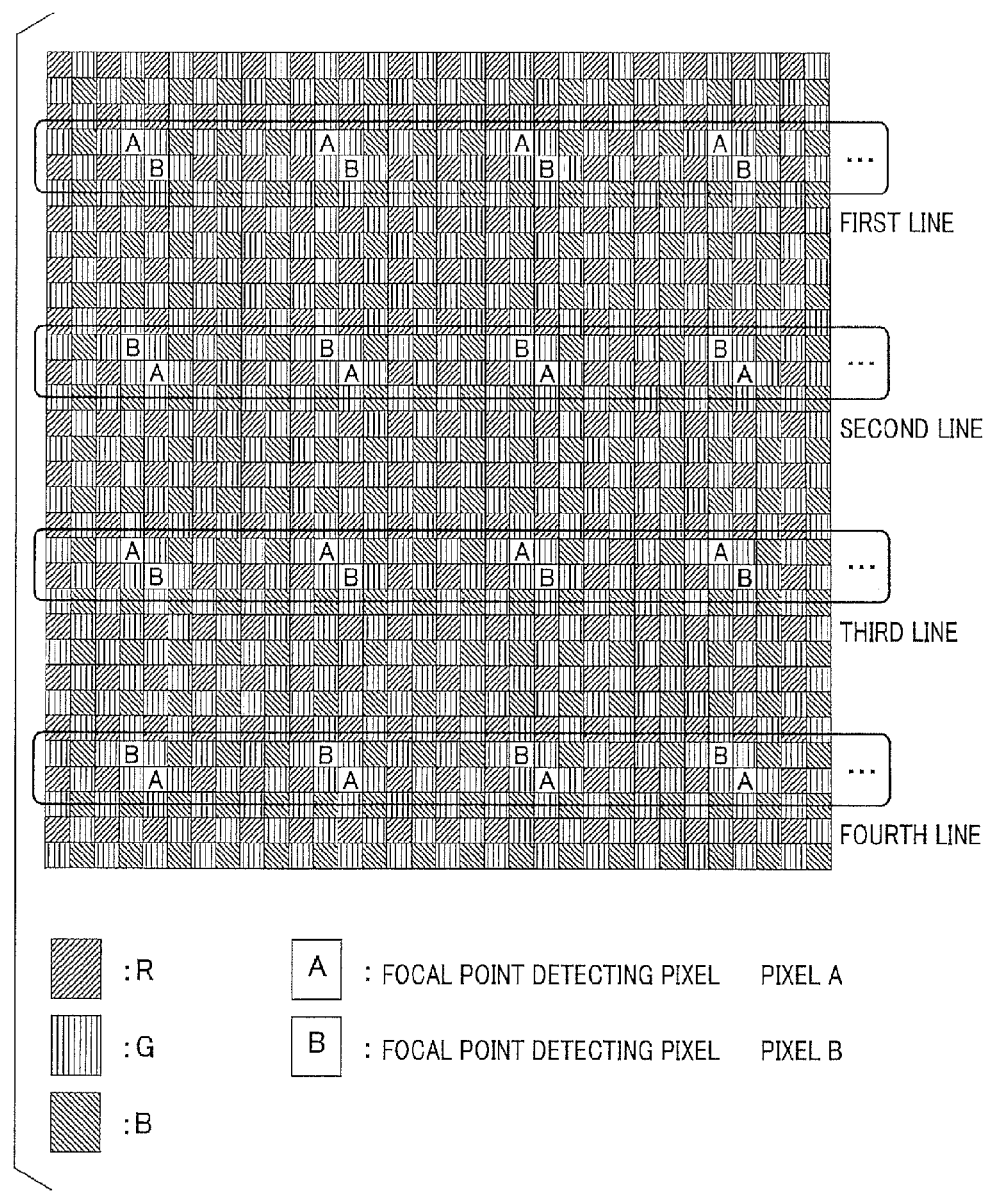
FIG. 3 is a plan view that shows a portion of an image-taking element.

FIG. 3 is a plan view that shows a portion of the image-taking element. The image-taking element 10 includes pixels arranged in plurality. These pixels each carry out photoelectric conversion, and, as a whole, function as a photoelectric conversion unit that outputs image formation data and a pair of image signals for the focal point detection. In FIG. 3, the letters "R", "B", and "G" represent the color of the color filter of each pixel. The pixel labeled with the character "R" indicates pixels that transmit the red component of the light, the pixel labeled with the character "G" indicates pixels that transmit the green component of the light, and the pixel labeled with the character "B" indicates pixels that transmit the blue component of the light. In FIG. 3, the colors "R", "B", and "G" are indicated by hatch patterns. In addition, each of the "R", "B", and "G" pixels is disposed according to what is referred to as a "Bayer array". Because the arrangement of the color filters is in a Bayer array, one picture element unit is formed by one "R" and "B" pixel each and two "G" pixels. However, in the image-taking element 10 of the present embodiment, a portion of the locations for "R" and "B" pixels are assigned to focal point detecting pixels that receive light flux that has been transmitted through a portion of the pupil area of the image-taking lens 5. In FIG. 3, the pixels labeled "A" and "B" (below, referred to as "pixel A" and "pixel B") are pixels for detecting the focusing state of the image-taking lens 5, and the opening in the X direction (the transverse direction in FIG. 3) is delimited by an electrode 131. In addition, light rays that have passed through different zones in the pupil form images at pixels A and pixels B, which will be described below.

In the present embodiment, phase difference AF in the imaging plane can be performed by providing pixels A and pixels B, which are the focal point detecting pixels. The expression "phase difference AF at the imaging plane" denotes an AF operation in which the function of a phase difference detecting sensor that is necessary for conventional phase difference AF is performed in cooperation with the image-taking element 10 that captures the subject image. As shown in FIG. 3, in the present embodiment, a pixel A and a pixel B are neighboring pixels, and the distance therebetween is made as short as possible. This arrangement minimizes the possibility that pixel A and pixel B will be exposed to differing patterns. The focus detecting error is thereby reduced. In addition, the boundary positions are aligned in even numbered lines and odd numbered lines, and the position of pixels A and pixels B are reversed in the even numbered lines and the odd numbered lines. Thus, even in the case in which an edge portion of the subject is at the boundary portion between pixel A and pixel B, the phase shifting of the images that are obtained from pixel A and pixel B occurs simultaneously in both. Furthermore, the amount of the shift is uniform and in opposite directions. Thus, in the present embodiment, the focal point detection errors cancel each other out by carrying out a correlation computation using at least two sets of lines that are adjacent in a direction that is perpendicular to the pupil-splitting direction. Thus, in the present embodiment, the number of pairs of images is always made even. The focal point detection error can thereby be reduced.

Figure 4:
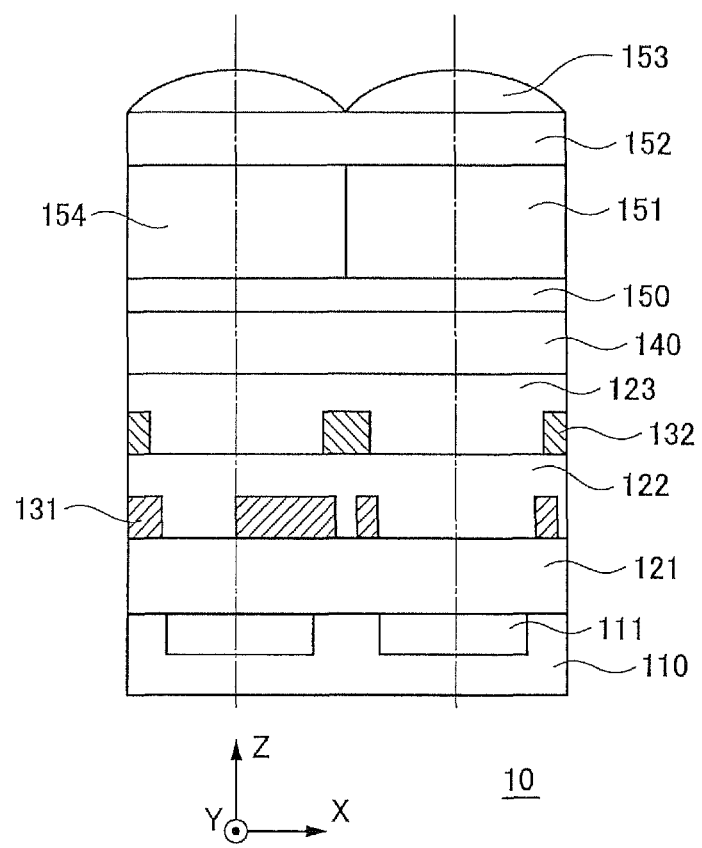
FIG. 4 is a cross-sectional view of the pixels shown in FIG. 3, including a pixel having an aperture that is delimited in the x-direction and pixel that can receive light from the entire pupil area.

FIG. 4 is a cross-sectional view of a pixel with an opening that is restricted in the X direction and a pixel that can receive light from the entire pupil area, where the pixels A and B are shown in FIG. 3. The pixel on the right side of FIG. 4 can receive light from the entire pupil area of the image-taking lens 5, and the pixel on the left side of FIG. 4 can receive light flux from a portion of the pupil area of the image-taking lens 5 because the opening is restricted in the X direction. This will be explained below with reference to FIGS. 5A and 5B. In an image-taking element 10, a photoelectric conversion portion 111 is formed embedded in a silicon substrate 110. The signal charge that is generated by the photoelectric conversion portion 111 is output to the outside via a floating diffusion portion (not illustrated), a first electrode 131, and a second electrode 132. An interlayer insulating film 121 is formed between the photoelectric conversion layer 111 and the first electrode 131, and an interlayer insulating film 122 is formed between the first electrode 131 and the second electrode 132. In addition, an interlayer insulating film 123 is formed on the side of the second electrode 132 to which light is incident. Furthermore, a passivation film 140 and a planarization layer 150 are formed. A color filter layer 151, a planarization layer 152, and a microlens 153 are formed at the side of the planarization layer 150 to which light is incident. Here, the power of the microlens 153 is set such that the pupil of the image-taking lens 5 and the photoelectric conversion portion 111 become substantially conjugate. In addition, at the pixel that is positioned at the center of an image-taking element 10, a microlens 153 is arranged at the center of the pixel, and at the pixels positioned in the vicinity, the microlens 153 is arranged so as to be offset toward the optical axis side of the image-taking lens 5. The subject light that has passed through the image-forming lens 5 is condensed in proximity to the image-taking element 10. Furthermore, the light that has reached each of the pixels of the image-taking element 10 is diffracted by the microlens 153 and condensed onto the photoelectric conversion portion 111. At the pixel on the right side of the figure, which is used for normal image capture, a first electrode 131 and the second electrode 132 are arranged such that incident light is not blocked. In contrast, at the pixel on the left side of the figure, which carries out the focal point detection of the image-taking lens 5, a portion of the first electrode 131 is formed so as to cover the photoelectric conversion portion 111. As a result, light flux that passes through a portion of the pupil of the image-taking lens 5 can be received at the focal point detecting pixel on the left side in the figure. In addition, in order to prevent the output of the photoelectric conversion portion 111 from being attenuated because the first electrode 131 blocks a portion of the incident light flux, the color filter layer 154 of the focal point detecting pixel is formed by a resin that does not absorb light and has a high transmittance.

Figure 5A:
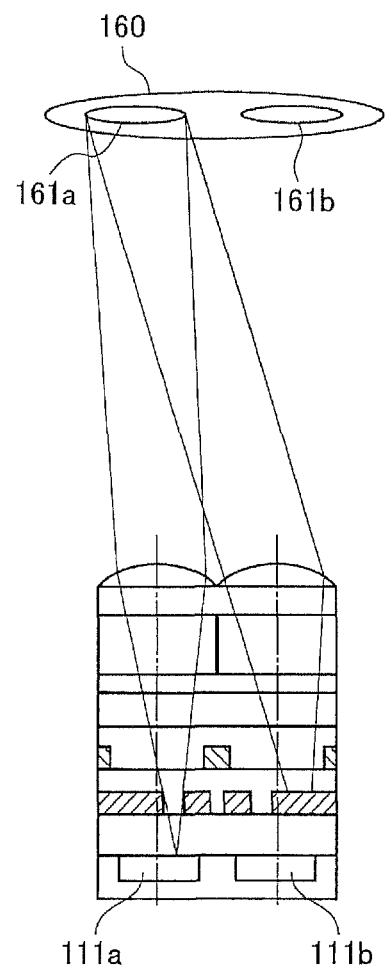
FIG. 5A is a drawing that shows the relationship between the cross-section of pixel A and pixel B that are shown in FIG. 3, and the pupil.
Figure 5B:
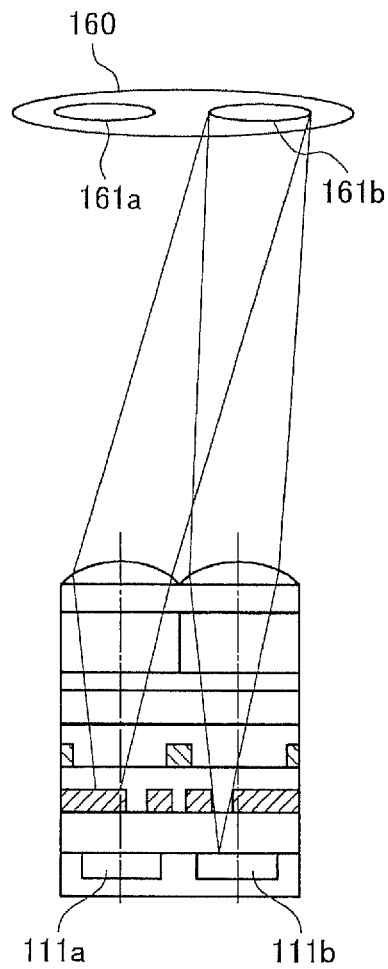
FIG. 5B is a drawing that shows the relationship between the cross-section of pixel A and pixel B that are shown in FIG. 3, and the pupil.

FIGS. 5A and 5B are drawings that show the relationship between the cross-section of pixel A and pixel B shown in FIG. 3 and the pupil. FIG. 5A is a drawing for explaining the optical path of the light flux that passes through the pupil area 161a, and FIG. 5B is a drawing for explaining the optical path of the light flux that passes through the pupil area 161b. In FIGS. 5A and 5B, the pixel on the left side corresponds to the pixel A in FIG. 3, and the pixel on the right side of the figure corresponds to the pixel B in FIG. 3. In FIGS. 5A and 5B, the pupil 160 of the image-taking lens 5 is schematically shown, and the photoelectric conversion portions 111a and 111b respectively correspond to pixel A and pixel B. As shown in FIGS. 5A and 5B, the openings of pixel A and pixel B are provided so as to possess differing eccentricities with respect to the optical axes of the microlens 153. Thus, the light flux that passes through the pupil area 161a that is shown in FIG. 5A reaches the photoelectric conversion portion 111a of pixel A but does not reach the photoelectric conversion portion 111b of pixel B. In contrast, the light flux that passes through the pupil area 161b that is shown in FIG. 5B reaches the photoelectric conversion portion 111b of pixel B, but does not reach the photoelectric conversion portion 111a of pixel A. Here, in the pupil-splitting unit, shown in FIG. 3, that enables obtaining light flux that has passed through the portion of the area of the pupil of the image-taking lens 5, the direction showing the relative positions of the two areas described above (in the present embodiment, the X-axis direction) is defined as the pupil-splitting direction. In addition, in a plane orthogonal to the optical axis, the direction that is normal to the pupil-splitting direction (in the present invention, the Y-axis direction) is defined as the direction normal to the pupil-splitting. In addition, an explanation has been provided in which the image-taking element 10 of the first embodiment only includes pixels having a pupil-splitting direction that is in the X-axis direction, but a configuration may also be used in which the image-taking element 10 has overlapping pixels for which the pupil-splitting direction is normal to this direction (i.e., the Y-axis direction). In the present invention, because directions have been defined as a pupil-splitting direction and a direction normal to pupil-splitting, if care is taken, these directions can also be easily applied to the focal point detecting pixels, for which the pupil-splitting direction is in the Y-axis direction.

Figure 6A:
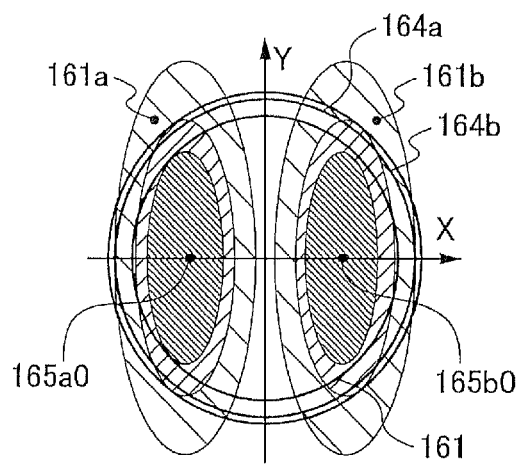
FIG. 6A is a drawing that schematically shows the light flux that is incident from the pupil 160 of the image-taking lens 5 to pixel A and pixel B.
Figure 6B:
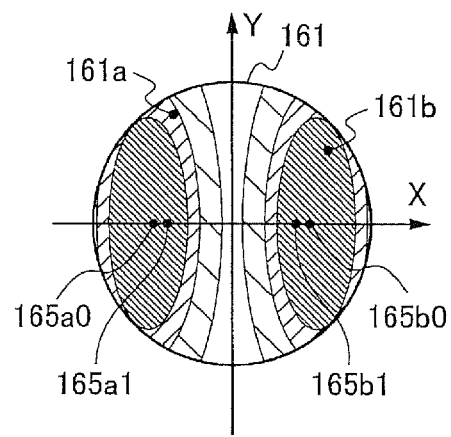
FIG. 6B is a drawing that schematically shows the light flux that is incident from the pupil 160 of the image-taking lens 5 to pixel A and pixel B.
Figure 6C:
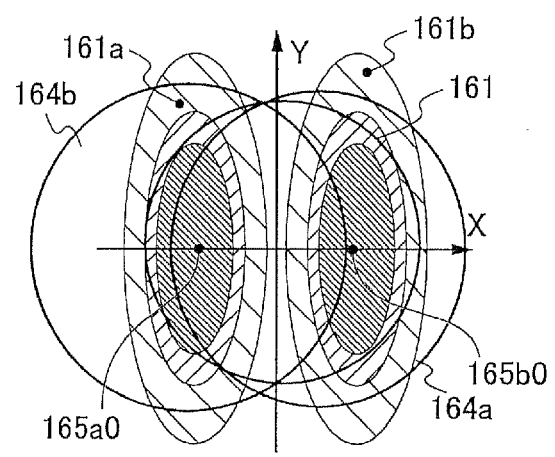
FIG. 6C is a drawing that schematically shows the light flux that is incident from the pupil 160 of the image-taking lens 5 to pixel A and pixel B.
Figure 6D:
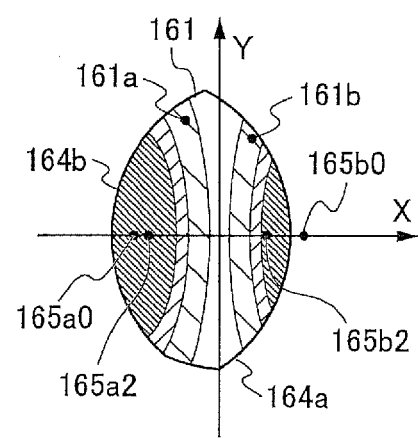
FIG. 6D is a drawing that schematically shows the light flux that is incident from the pupil 160 of the image-taking lens 5 to pixel A and pixel 13.

FIGS. 6A to 6D are drawings that schematically show the light flux that is incident to pixel A and pixel B from the pupil 160 of the image-taking lens 5. FIG. 6A shows, in proximity to the center of the image-taking element 10, the relationship between the area to which the light flux is incident on pixel A and pixel B and the pupil. FIG. 6B shows, in proximity to the center of the image-taking element 10, the appearance when the area at which the light flux that is incident to pixel A and pixel B is cut by a window frame and the like. FIG. 6C shows, at a position where the image height is high in the X-direction, the relationship between the area at which light flux is incident to pixel A and pixel B and the pupil. FIG. 6D shows, at a position where the image height is high in the X-direction, the appearance when the area at which the light flux that is incident to pixel A and pixel B is cut by a window frame or the like. In FIGS. 6A to 6D, a reference numeral (161a), which is identical to that of the pupil area, is appended to the area of the light flux that has passed through the pupil area 161a and is incident to pixel A, and a reference numeral (161b), which is identical to that of the pupil area, is appended to the area of the light flux that has passed through the pupil area 161b and is incident to pixel A. In addition, the ratio of the incidence is shown by the cross-hatching density. A large amount of light is incident to an area that is heavily hatched, and only a small amount of light is incident to an area that is lightly hatched. The causes of differences between ratios of incidence that depend on the area of the pupil include the aberration of the microlens, the combination error of the optical powers, and the diffraction of light and the like. In addition, the frame 161 that is delimited by the diaphragm 53, the frame 164 that is delimited by the window frame 53a, and the frame 164b that is delimited by the window frame 53b are shown overlapping in the area of the incident light flux. Furthermore, the weighted centers of 161a and 161b where there is no vignetting (hereinbelow, the weighted center of the light amount distribution) are respectively shown as 165a0 and 165b0. The weighted centers of 161a and 161b in the state that is shown in FIG. 6B are respectively shown by 165a1 and 165b1. The weighted centers of 161a and 161b in the state that is shown in FIG. 6D are respectively shown by 165a2 and 165b2. As shown in FIG. 6A, if there is no vignetting, areas in which light fluxes have passed through the pupil area 161a and the pupil area 161b and are respectively incident to pixel A and pixel B are present also outside the frame (pupil) 161 of the image-taking lens 5. However, actually, vignetting is produced by the frame 161 that is delimited by the diaphragm 53, the frame 164a that is delimited by the window frame 53a, and the frame 164b that is delimited by the window frame 53b. Thus, as shown in FIG. 6B, light in the range that is cut off by the frame 161 reaches the image-taking element 10. Then, as shown in FIG. 6B, the weighted centers 165a1 and 165b1 of the area 161a of the light flux incident to pixel A and the area 161b of the light flux incident to pixel B move due to vignetting. As shown in FIGS. 6(a) and (b), when viewed from the center of the image-taking element 10, because the frame 164a and the frame 164b are positioned farther to the outside than the frame 161 that is delimited by the diaphragm 53, the amount of light incident to pixel A and pixel B is not limited. The frame 164a is delimited by the window frame 53a and the frame 164b is delimited by the window frame 53b. In contrast, as shown in FIGS. 6(c) and (d), when viewed from a position where the image height is high, the frames 164a and 164b that project the window frames 53a and 53b onto the pupil plane are eccentric depending on the image height. In FIG. 6C, due to being viewed from a position in the +X direction, the frame 164a of the window frame 53a, which is close to the image-taking element 10, is eccentric in the +X direction, and the frame 164b of the window frame 53b, which is distant from the image-taking element 10, is eccentric in the +X direction. As a result, an area appears that extends more inward than the frame 161 that is delimited by the diaphragm 53.

In the example shown here, as shown in FIG. 6D, the area 161a, at which light flux is incident to pixel A, and the area 161b, at which light flux is incident to pixel B, are extracted by frames 161, 164a, and 164b, respectively, of the diaphragm 53, and the window frames 53a and 53b. As shown in FIG. 6D, here the weighted centers 165a2 and 165b2 of the area 161a at which light flux is incident to pixel A and the area 161b at which light flux is incident to pixel B move due to vignetting. In addition, the amounts of light respectively incident to pixel A and pixel B differ due to vignetting. Thus, in order to carry out the focal point detection correctly, preferably the movement of the weighted centers of the incident light due to the vignetting is compensated. Above, as explained with reference to FIGS. 6A to 6D, the weighted centers of the area 161a of light flux incident to pixel A and the area 161b of light flux incident to pixel B vary in a complex manner due to the state of the vignetting that is determined by the image height. In addition, the camera body 1 that is shown in the present embodiment can use various interchangeable lenses because the image-taking lens 5 is detachable, and various image-taking optical systems can be used. In this situation, in an image-taking lens 5 that has a complicated optical system, finding the weighted center of the image by anticipating the vignetting described above is difficult.

Figure 7:
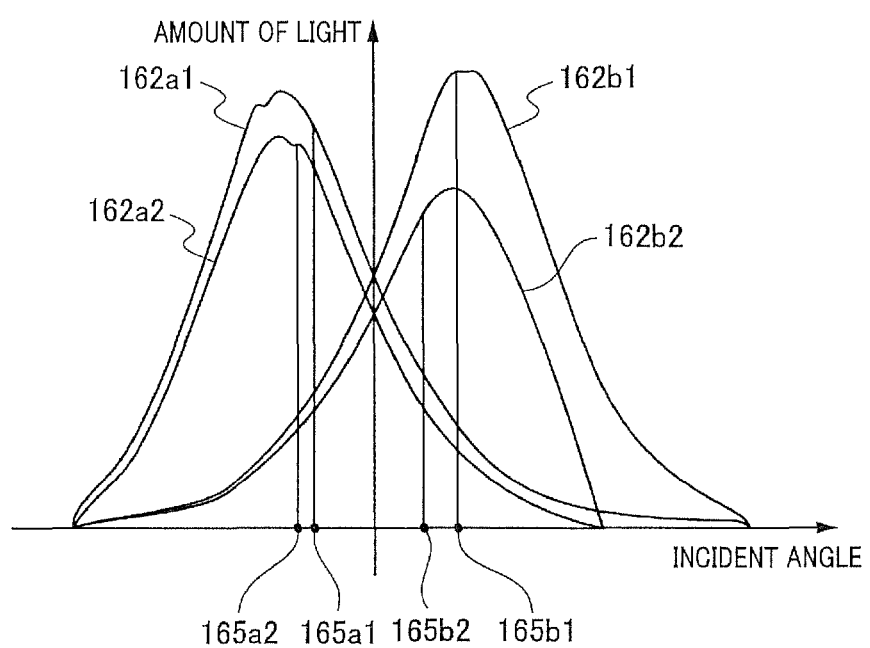
FIG. 7 is a drawing in which the light flux in the areas shown in FIGS. 6B and 6D is integrated in a direction perpendicular to the pupil-splitting and is shown by a one-dimensional image in the pupil-splitting direction.

FIG. 7 is a drawing that shows the light flux in the areas that are shown in FIGS. 6A and 6B by using a one-dimensional image in the pupil-splitting direction after being integrated in the direction normal to the pupil-splitting. FIG. 7 corresponds to the line-spread diagram that is generated by a focal point detecting pixel group (first line and second line and the like in FIG. 3). In FIG. 7, the line spread of pixel A in FIG. 6B is shown by the curve 162a1, the line spread of pixel B in FIG. 6B is shown by the curve 162b1, the line spread of pixel A in FIG. 6D is shown by the curve 162a2, and the line spread of pixel B in FIG. 6D is shown by curve 162b2. In addition, in FIG. 7, the weighted center of the curve 162a1 is shown by the point 165a1, the weighted center of the curve 162a2 is shown by the point 165a2, the weighted center of the curve 162b1 is shown by the point 165b1, and the weighted center of the curve 162b2 is shown by the point 165b2. As can be understood from FIG. 7, because the incident angle characteristics of pixel A and pixel B are different, during defocusing, blur in the pupil-splitting direction is produced in the image of pixel A and the image of pixel B. The amount of the blur with respect to a unit defocusing amount (corresponding to the phase difference in the line spread shown by the signals obtained from pixel A and pixel B) can be represented by the distance between the weighted centers. The conversion coefficient for converting the blur amount (or the phase difference) to a defocusing amount is calculated from the distance between the weighted centers, and then stored the in memory circuit 22 to be used by the focal point detecting operation, which will be described below. Naturally, when the distance between weighted centers cannot be correctly calculated, an incorrect conversion coefficient will be calculated. Thus, in the present embodiment, the compensation of the conversion coefficient, which will be described below, is automatically performed in accordance with the normal photographing operation of the user.

Figure 8:
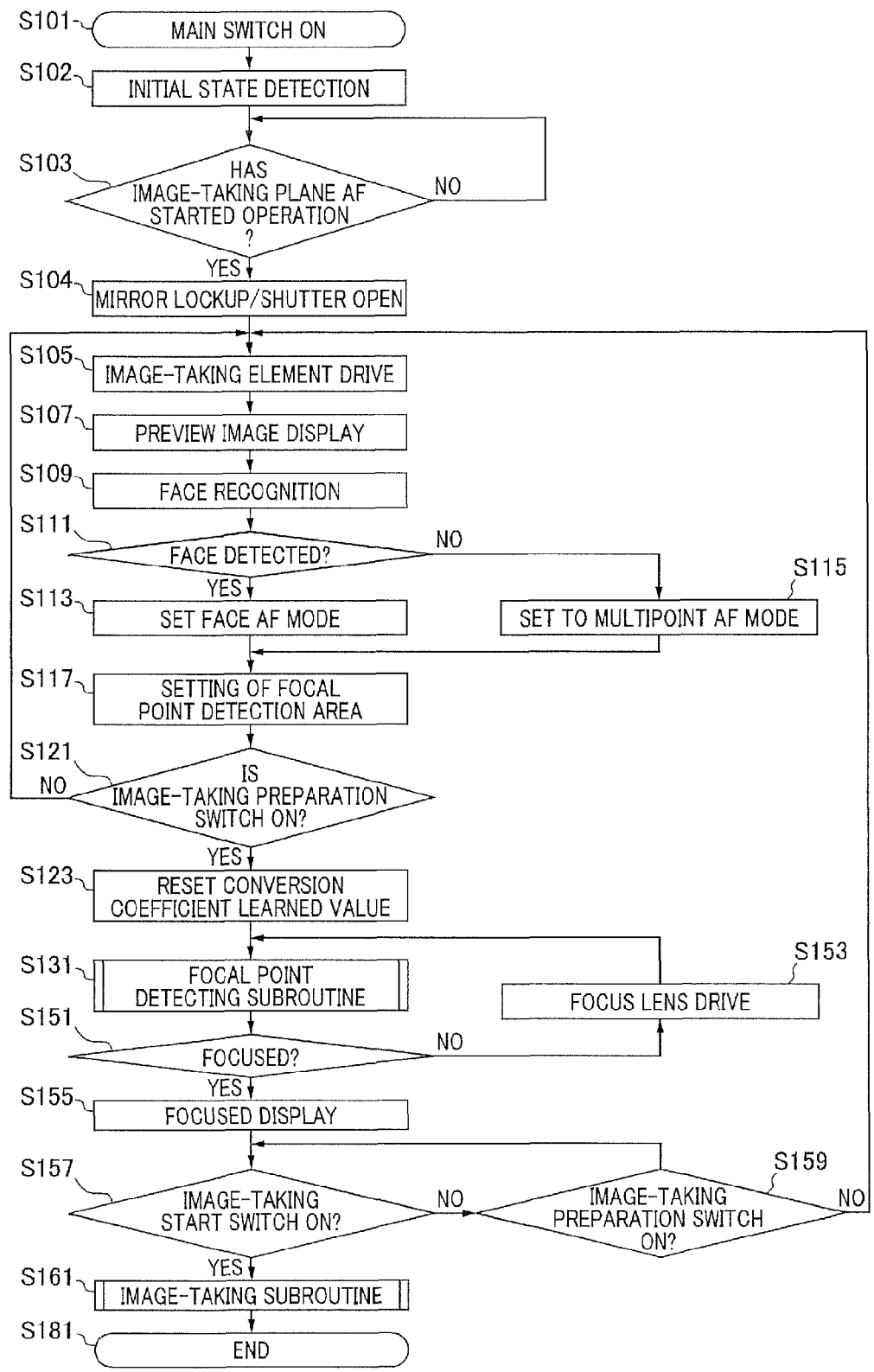
FIG. 8 is a flowchart that shows the main flow of the camera of the present embodiment.

Next, with reference to FIG. 8 to FIG. 13, the focus adjustment and image-taking operation of the camera of the present embodiment will be explained. FIG. 8 is a flowchart that shows the main flow of the camera of the present embodiment. In step 101 (hereinbelow, the term "step" is denoted by "S"), the operator turns the power switch of the camera 1 ON. In S102, the CPU 20 confirms the operation of each of the actuators in the camera and the image-taking element 10, initializes the memory content and the executed programs, and executes the image-taking preparation actions. In S103, it is determined whether or not phase difference AF at the imaging plane (below, referred to as "imaging plane AF") is being carried out as a focus operation. Note that the determination of whether a focusing operation is being performed is carried out based on the commands of the operator, such as turning ON an AF start button (not illustrated) and the like. In S104, because imaging plane AF is being carried out, the mirror lockup and shutter opening operations are carried out. In S105, the image-taking operation of the image-taking element is started, and a low-resolution moving image for preview is output. In S107, the moving image that has been read out is displayed in the display 11 that is provided in the back surface of the camera, and the operator determines the composition while photographing by viewing this preview image. In S109, face recognition in the preview moving image is started. In S111, it is determined whether or not a face has been detected. In the case in which the presence of a face has been recognized in the field of view, the processing proceeds from S111 to S113, and the focal point adjusting mode is set to face AF mode. Here, the term "face AF mode" denotes an AF mode in which the focal point is aligned with a face in the field of view. In contrast, in the case in which a face is not present in the field of view, the processing proceeds from S111 to S115, and the focal point adjusting mode is set to the multipoint AF mode.

Here, the term "multipoint AF mode" denotes a mode in which the field of view is divided, for example, into 3×5=15 parts, focal point detection is performed for each of the divided areas, the main subject is inferred from the focal point detection results and the luminance information of the subject, and focusing is carried out on this area. In S113 or S115, when the operation is determined to be in the AF mode, the focal point detection area is determined in S117. In S121, it is determined whether or not the photograph preparation switch has been turned ON. If the photograph preparation switch has not been turned ON, the processing returns to S105, and the determination of the focal point detection area of S117 is repeatedly executed from the image-taking element drive. In S121, when the photography preparation switch is turned ON, the processing proceeds to S123, and after the conversion coefficient learned value, which is data for learning the conversion coefficient, has been reset, the processing proceeds to S131, and the focal point detecting subroutine (FIG. 9) is executed.

Figure 9:
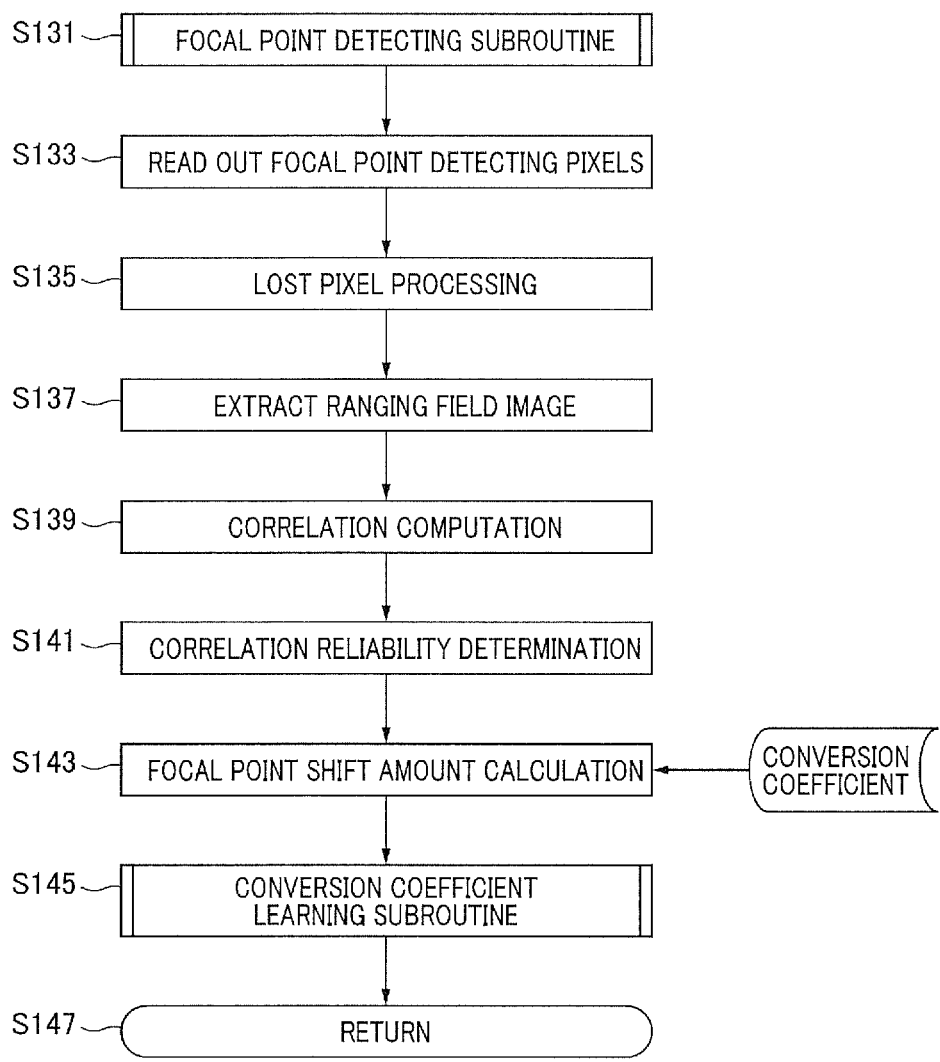
FIG. 9 is a flowchart that shows the focal point detection subroutine.
Figure 10:
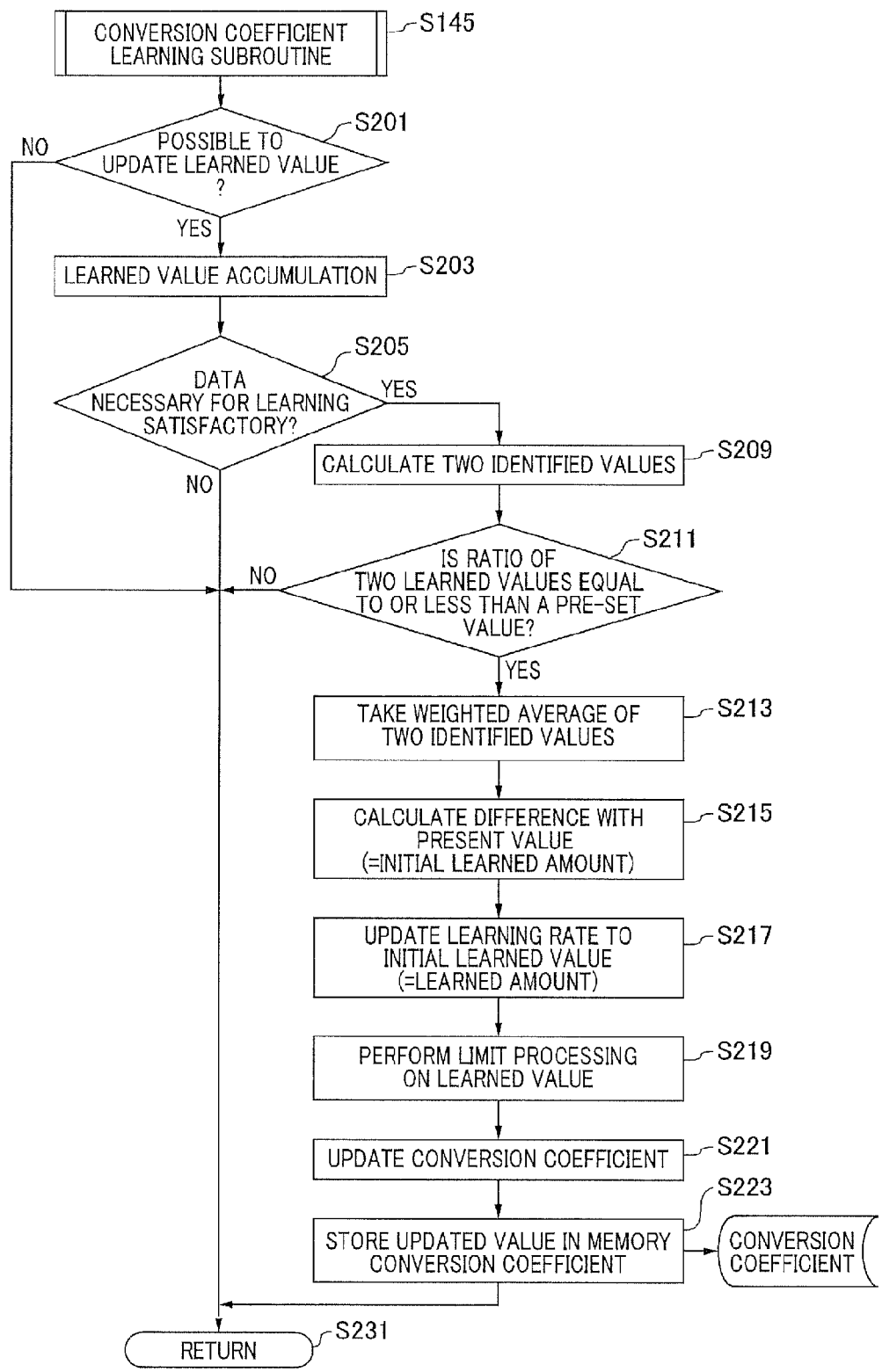
FIG. 10 is a flowchart that shows the conversion coefficient learning subroutine.

FIG. 9 is a flowchart that shows the focal point detecting subroutine. This focal point detecting subroutine is mainly carried out by the phase difference detecting unit 20a and the conversion unit 20b of the CPU 20. When the processing jumps from the main routine to S131 of this subroutine, in S133, the image signal that is used for the phase difference detection is read out from the focal point detecting pixels that are included in the focal point detection area that has been determined in S117 of the main routine. In S135, the processing of focal point detecting pixels, which are lost pixels, is carried out. For example, the values of the lost pixels may be interpolated based on the values of the adjacent pixels. In S137, a pair of images to be subjected to a correlation calculation, which is based on the signal that was compensated in S135, is extracted. In S139, the correlation computation of the obtained two image signals is carried out, and the amount of relative positional shift (i.e., the phase difference) between the two image signals is calculated. In S141, the reliability of the correlation computation is determined. Here, the term "reliability" denotes the degree of agreement between the two images, and when the degree of agreement between the two images is high, generally the reliability of the focal point detection result is high. Thus, when plural focal point detection areas have been selected, information having a high reliability is preferentially used. In S143, the defocus amount is calculated based on the detected results that have a high reliability and the conversion coefficient. Then, in S145, the processing proceeds to the conversion coefficient learning subroutine (FIG. 10). In this manner, in the present embodiment, the conversion coefficient is calibrated according to the result of the movement of the focal point position during a focus operation that is carried out when the operator photographs a subject.

FIG. 10 is a flowchart that shows the conversion coefficient learning subroutine. When the processing jumps from the focal point detecting subroutine in FIG. 9 to S201 of the conversion coefficient learning routine, it is determined whether or not the present learned value can be updated based on the reliability that has been found by the focal point detecting subroutine. When the reliability is low, the conversion coefficient learning subroutine terminates without updating the learned value, and the processing proceeds to S231. When the reliability is high, learning is carried out by moving to S203 and accumulating the learned value. In this context, the term "learned value" denotes the present focal point shift amount and the lens drive amount (or the amount of movement of the focal point position that has been moved due to the driving of the lens) by which the lens has moved to perform a focusing operation between performing the previous focal point detection and the present focal point detection. However, when there is no learned value after carrying out the reset in S123 (i.e., when the focal point detection is being carried out the first time), only the current focal point shift amount is saved. In addition, when learned values have already been sufficiently accumulated, the oldest data is deleted, and after moving remaining data in sequence to the side that contained the older data, new data is accumulated (i.e., carrying out what is referred to as FIFO processing). Thereby, the newest data is accumulated as learned data. Note that in the present embodiment, the lens drive amount can be obtained by a conversion based on the rotation amount of the AF motor (not illustrated) that is driven by commands from the focal point moving unit 20c. However, the amount of movement of a member that is actually moved during the focusing operation, such as the frame that holds the focusing lens, can also be used. In addition, the lens drive amount itself, which is specified by the focal point moving unit 20c, may also be used. In S205, it is determined whether there are sufficient accumulated learned values. In the present embodiment, when the lens has been driven several times and two lens drive amounts and three focal point shift amounts have been found, it is determined that there are sufficient learned values, and the routine moves to S209. When the data is insufficient, the processing proceeds to S231, which terminates the conversion coefficient learning subroutine. In S209, two identified values are calculated.

Figure 11:
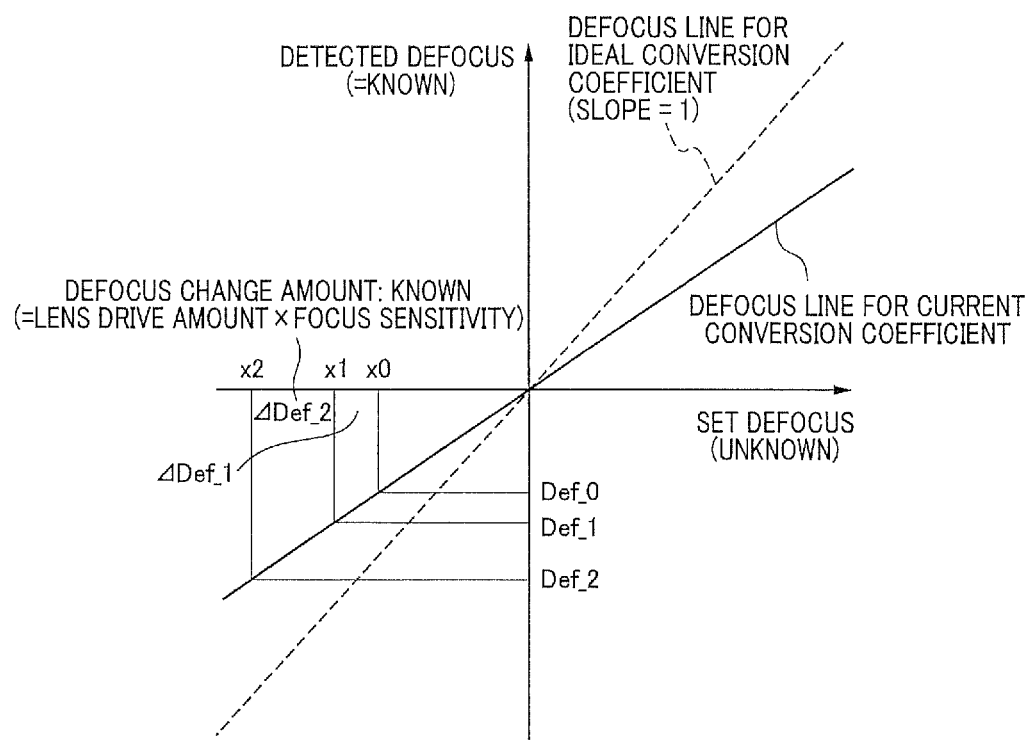
FIG. 11 is a drawing for explaining the calculation of an identified value.

FIG. 11 is a drawing for explaining the calculation of the identified values. In FIG. 11, the abscissa is the actual defocus amount, and it is an unknown value. The ordinate is the defocus amount that has been calculated by the focal point detecting subroutine (hereinbelow, referred to as the "detected defocus amount"), and it is a known value. Here, this detected defocus amount is given by the following equation (1):

[Math. 1]

$$Def_n = K\Delta_n \quad \text{Formula (1)}$$

where $Def_n$ is the detected defocus amount that is obtained when the focal point detection has been carried out n times, $\Delta_n$ is the blur amount that is obtained when the focal point detection has been carried out n times, and K is the conversion coefficient. Under ideal conditions, the actual defocus amount and the detected defocus amount agree. In FIG. 11, this is shown by the broken line having a slope of 1. However, as explained in FIGS. 6A to 6D and FIG. 7, when the conversion coefficient cannot be correctly estimated, as is clear from the definition of equation (1), the slope cannot be correctly found. As a result, as shown by the solid line in FIG. 11, these amounts deviate from the slope of 1. For example, in the example shown in FIG. 11, the case is shown in which the slope is small because the estimation of the conversion coefficient K is low. In FIG. 11, the detected defocus amounts at appropriate defocus amounts x0, x1, and x2 are indicated by Def_0, Def_1, and Def_2. In the main flow, which will be explained below, when it is determined that the lens is not in focus, the focus lens is driven. When the actual defocus amount is changed by driving the focus lens, values of x0, x1, and x2 cannot be known, but the differences (x1−x0) and (x2−x1) can be known, and are given by the following formula (2):

[Math. 2]

$$\Delta Def_n = (x_n - x_{n-1}) = (\text{lens drive amount}) \times (\text{focus sensitivity}) \quad \text{Formula (2)}$$

In formula (2), $\Delta Def_n$ is a coefficient for converting a detected defocus amount into an actual defocus amount, which has changed during the interval from the nth focal point detection to the n−1 focal point detection. The lens drive amount is a coefficient for converting a value into an amount by which the focus lens is driven. The focus sensitivity is a coefficient that converts the drive amount of the focus lens into an actual defocus amount. As shown by the broken line in FIG. 11, when the value of a straight line having a slope of 1 is obtained as a detected defocus amount, $\Delta Def_2$ is equal to (Def_2−Def_1), and $\Delta Def_1$ is equal to (Def_1−Def_0). When generalized, it can be represented by the following formula (3).

[Math. 3]

$$\Delta Def_n = (Def_n - Def_{n-1}) = K(\Delta_n - \Delta_{n-1}) \quad \text{Formula (3)}$$

In contrast, as shown by the solid line in FIG. 11, when a value that deviates from the straight line having a slope of 1 is obtained as a detected defocus amount, the values in formula (3) do not become unequal. That is, the conversion coefficient K can be correctly calibrated by comparing the lens drive amount, the focus sensitivity, and the detected defocus amount.

[Math. 4]

$$K_n = \frac{\Delta Def_n}{(\Delta_n - \Delta_{n-1})} \quad \text{Formula (4)}$$

In formula (4), K is a value (identified value) that is identified from the detected defocus amount when the n−1 and nth focal point detections have been carried out and the focus lens drive amount by which the focus lens was moved during the interval from the n−1 time to the nth time. The detected defocus amount corresponds to the actual amount of movement of the focal point position in the interval from the n−1 time to the nth time. The focus lens drive amount corresponds to a drive amount of the focal point position that the focal point moving unit 20c has expected in the interval from the n−1 time to the nth time. In the present embodiment, these two values are found, and they are given by $K_n$ and $K_{n-1}$. $K_n$ and $K_{n-1}$ are found, as explained above, by the operation of S209. In S211, it is determined whether or not the ratio between the two identified values $K_n$ and $K_{n-1}$ or the absolute value of the difference therebetween is equal to or less than a specified value (that is, an upper limiting value), and if the identified value or the absolute value is equal to or less than the specified value (an upper limiting value), the processing proceeds to S213 to update the calculation of the learned value. In contrast, in the case in which the ratio of the two identified values $K_n$ and $K_{n-1}$ or the absolute value of the difference therebetween exceeds the specified value (an upper limiting value), the processing proceeds to S231, which terminates the conversion coefficient learning subroutine.

Figure 12:
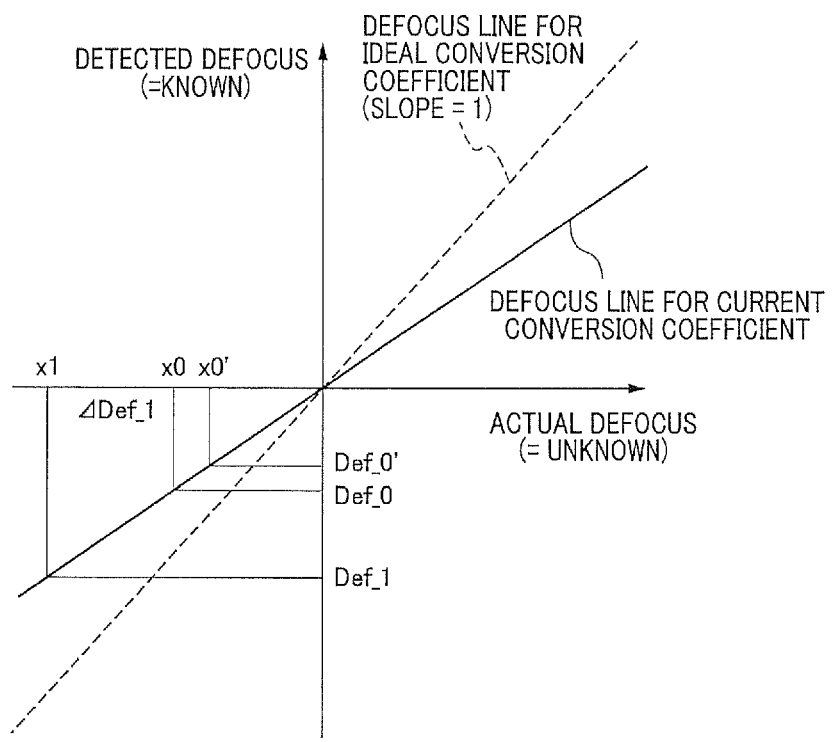
FIG. 12 is a drawing for explaining the effect of S211 in FIG. 10.

FIG. 12 is a drawing for explaining the effect of S211 in FIG. 10. In FIG. 12, x0 and x1 show appropriate defocus amounts, and the detected defocus amounts at this time are def_0 and def_1. x0' in FIG. 12 shows the defocus amount when the subject has moved, and the detected defocus amount at this time is def_0'. In FIG. 12, we consider the case in which focal point detection is carried out at the point x1, and then the focus lens is driven to control the defocus amount of $\Delta Def\_1$. Here, if the subject is stationary at a distance, as explained in FIG. 11, the conversion coefficient can be calibrated by comparing the lens drive amount, the focus sensitivity, and the detected defocus amount. However, when photographing a subject that is moving away into the distance, an incorrect value is obtained. In FIG. 12, the following value can be obtained:

[Math. 5]

$$K = \frac{\Delta Def_1}{(\Delta_1 - \Delta'_0)} \quad \text{Formula (5)}$$

where $\Delta'_0$ is the blur amount at the point x0'. In the example that is shown in FIG. 12, actually the conversion coefficient K should be identified as being small. However, according to FIGS. 5A and 5B, because the conversion coefficient K is found by the ratio of $\Delta Def_1$ and (Def_1−$\Delta def\_0'$), a value of K that is found that is unwanted because of the movement speed of the subject. Thus, in the present embodiment, the ratio of two identified values or the absolute value of the difference therebetween is monitored in S211. When the subject is moving away into the distance, the ratio of the two identified values deviates from 1, and the absolute value of the difference therebetween becomes large. Thus, an appropriate specified value (upper limiting value) is set in advance in order to prevent unwanted learning, due to the movement of the subject, from progressing. In S213, the weighted average of the two identified values is taken.

[Math. 6]

$$K'_n = \frac{w_n K_n + w_{n-1} K_{n-1}}{w_n + w_{n-1}} \quad \text{Formula (6)}$$

In formula (6), $w_n$ is the weight added to $K_n$. $w_n$ is a function of the blur amount that has been found in S139 and the lens drive amount that was used when finding $K_n$. Because $w_n$ is made a function of the blur amount, it is possible to reduce the influence of the case in which the calculation of the blur amount becomes incorrect due to a large defocus or the like. In addition, because $w_n$ is made a function of the lens drive amount that was used when finding $K_n$, it is possible to reduce the influence of the lens stopping precision that cannot be ignored when making extremely fine drive movements. That is, the degree of calibration of the conversion coefficient changes depending on the drive amount of the focus lens (specifically, the amount of movement of the focal point position), and an incorrect calibration will not be carried out when the lens stopping precision is low. As an advantageous example, an appropriate function is set such that the weight $w_n$ is reduced in cases in which the blur amount is large or the lens drive amount is small or the like. In S215, the difference between the weight averaged conversion coefficient and the current conversion coefficient is calculated as an initial learned value. Specifically, this calculation is given by the following formula (7):
[Math. 7]

$$\Delta K_n = K_n' - K \qquad \text{Formula (7)}$$

where, in formula (7), K is the current conversion coefficient. In S217, the learned value (calibration value) is calculated by multiplying the value that has been found in S215 by an appropriate coefficient. Specifically, this calculation is given by the following formula (8):
[Math. 8]

$$\Delta K_n' = \eta \Delta K_n \qquad \text{Formula (8)}$$

where the coefficient $\eta$ sets an appropriate numerical value from 0 to 1 as a coefficient. As shown in formula (8), by multiplying by $\eta$, the learning proceeds according to what is termed a "first-order lag system". When $\eta$ is large, learning proceeds rapidly, and when $\eta$ is small, learning proceeds slowly. At the same time, $\eta$ works as a lowpass filter, and by setting $\eta$ appropriately small, even if an error is included in an identified value of the conversion coefficient each time, the conversion coefficients slowly converge to an average value. Thus, $\eta$ is set to an appropriate value from 0 to 1 taking into consideration the variation in the identified value. In S219, limit processing is carried out on the learned value (calibration value) that was found in S217. This is in order to avoid mistaken learning from proceeding rapidly when a mistaken identified value has been obtained. In the case in which the absolute value of the calibration amount $\Delta K'_n$ that is found by formula (8) is greater than an upper limiting value that has been found in advance, processing is carried out such that the absolute value becomes equal to or less than the upper limiting value. Thereby, calibration is carried out within a range in which the calibration value does not exceed a pre-set upper limiting value. In S221, the current value is updated by adding $\Delta K'_n$, and in S223, the updated value, that is, the calibrated conversion coefficient, is stored in the memory circuit 22. Subsequently, the processing proceeds to S231 and returns to the focal point detecting subroutine (FIG. 9). Returning to FIG. 9, after the focal point detecting subroutine has returned from the conversion coefficient learning subroutine, the processing proceeds to S147, and then returns to S151 in the main flow in FIG. 8. Returning to FIG. 8, in S151, it is determined whether or not the focus deviation amount that has been calculated in S143 in FIG. 9 is equal to or less than an allowed value. In addition, in the case in which the focal point blur amount is equal to or greater than an allowed value, it is determined that the lens is not in focus, and in S153, the focus lens is moved. Subsequently, S131 to S151 are repeatedly executed. In addition, when it is determined in S151 that a focused state has been reached, the focus display is carried out in S155, and the processing proceeds to S157. In S157, it is determined whether or not the photography start switch has been turned ON, and if the switch has not been turned ON, the processing proceeds to S159, and it is determined whether or not to maintain the image-taking standby state. In the case in which the image-taking standby state is maintained, the processing again proceeds to S157. In the case in which the image-taking standby state has been terminated, the processing returns to S105, and the preview operation is carried out again. In S157, when the photography start switch has been turned ON, the processing proceeds to S161, and the image-taking subroutine is executed.

Figure 13:
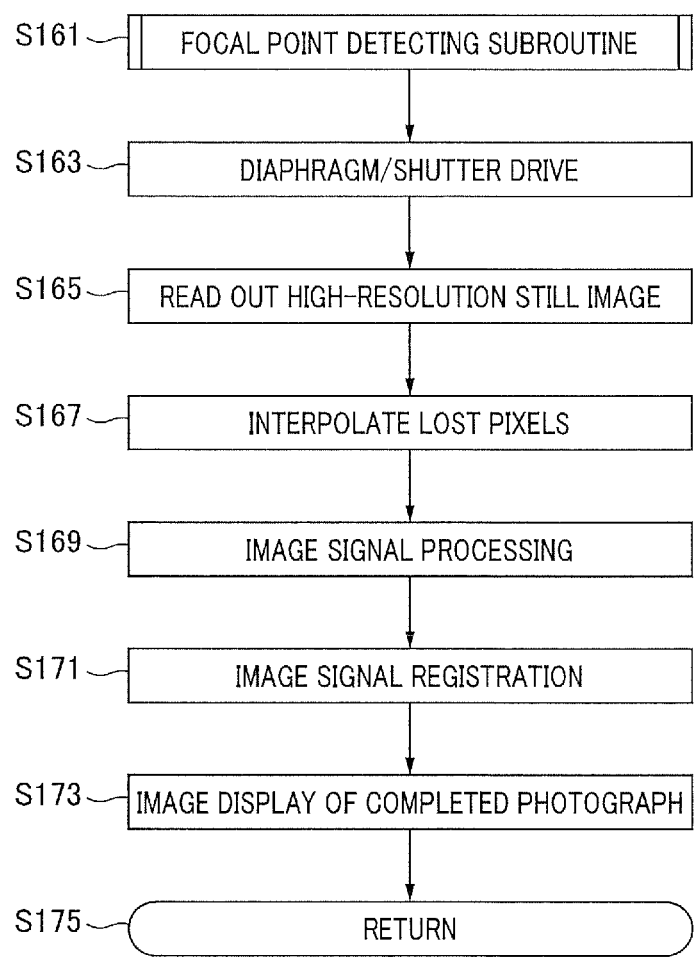
FIG. 13 is a flowchart that shows an image-taking subroutine.

FIG. 13 is a flowchart that shows the image-taking subroutine. When the photography start switch is operated via S161, in S163, the diaphragm 53, which adjusts the amount of light, is driven, and the opening control of a mechanical shutter, which determines the exposure time, is carried out. The shutter drive may be restarted after the shutter has been temporarily closed, or may be started such that the shutter closes after a reset operation of the image-taking element 10 has been electronically carried out. In S165, image reading, that is, the reading of all pixels, for high-resolution still image photography is carried out. In S167, pixel loss interpolation of the read-out image signals is carried out. Specifically, the output of pixel A and pixel B, which are focal point detection pixels, do not provide RBG color information for image-taking, and correspond to lost pixels when capturing an image. Thus, the image signal is created by interpolation based on information about the image-taking pixels adjacent to pixel A and pixel B. In S169, image processing, such as image compensation and edge enhancement and the like, is carried out, and in S171, the captured image is recorded to an external storage medium such as a memory card or to the memory circuit 22 that is built into the camera body 1. In S173, the completed photographic image is displayed in the display 11, and in S175, the processing returns to the main flow in FIG. 8. When returning to the main flow in FIG. 8, the sequence of image-taking operations is terminated by S181. According to the present embodiment, when the operator carries out the normal image-taking operation, the camera automatically carries out the calibration operation of the conversion coefficient. Specifically, the conversion coefficient is calibrated according to the movement result of the focal point position during the focusing operation that is carried out while the operator is photographing a subject. Thus, the calibration of the conversion coefficient that converts the blur amount to a defocus amount is carried out without the operator being particularly aware that this process is occurring, and an improvement in the AF speed and an improvement in the AF precision can be realized. As a result, the convenience can be improved.

Example 2

Figure 14:
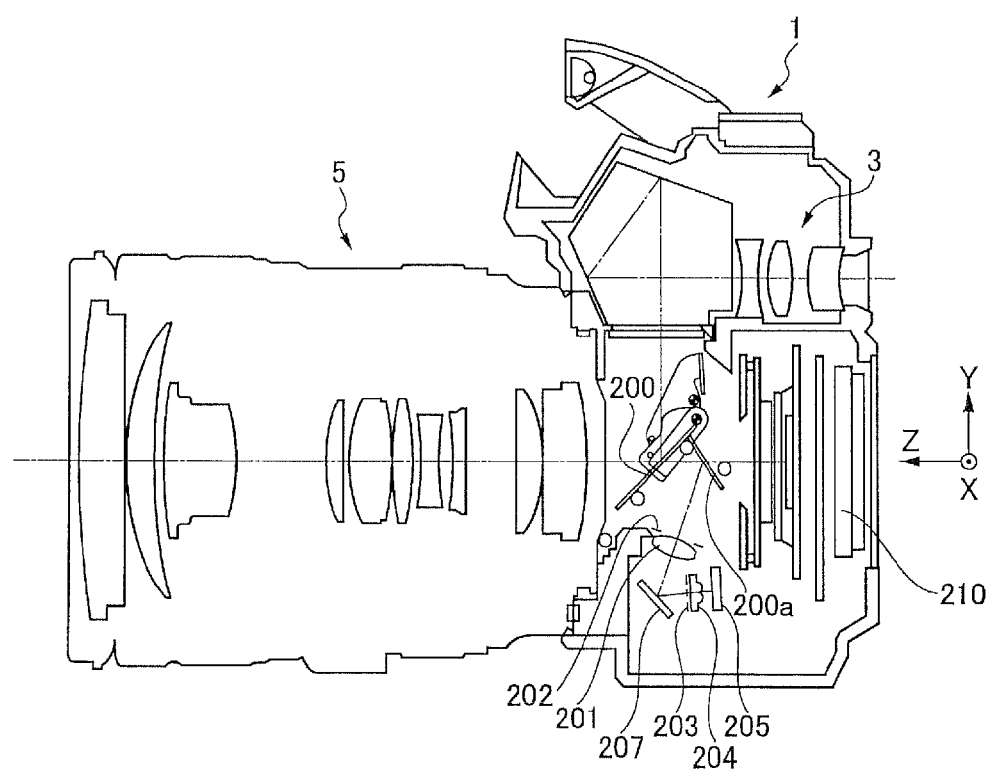
FIG. 14 is a cross-sectional view of the camera of a second embodiment of the present invention.
Figure 15:
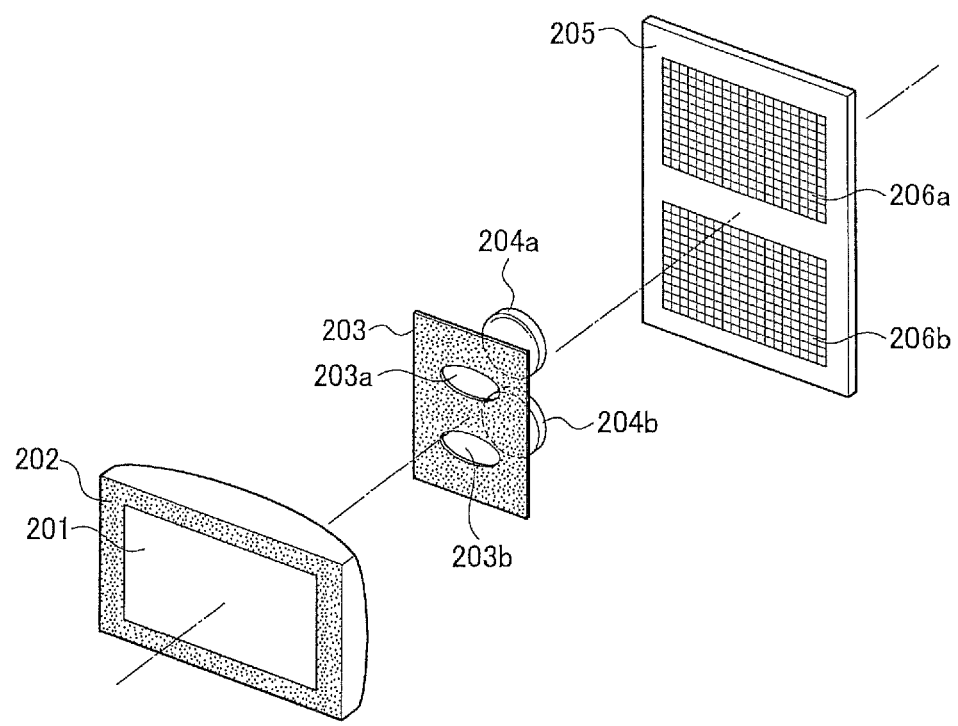
FIG. 15 is an exploded perspective view of the focus detecting optical system.

FIG. 14 is a cross-sectional view of a camera of a second embodiment of the present invention. The first embodiment is a configuration in which imaging plane AF is carried out by using an image-taking element 10, whereas, in contrast to the first embodiment, the second embodiment is a configuration in which focal point detection is carried out by providing a separate focal point detecting sensor 205. Thus, portions having functions that are identical to those of the first embodiment described above have identical reference numbers appended thereto, and redundant explanations are omitted where appropriate. The image-taking element 210 does not have focal point detecting pixels, and these portions serve as normal image-capturing pixels. Otherwise, the image-taking element 210 is identical to the image-taking element 10 of the first embodiment. In the apparatus that is shown in FIG. 14, when the operator is deciding the composition, the light path is changed by the reflex mirror 200 and the light flux is guided to a viewfinder 3 for observing the subject image. Simultaneously, the reflex mirror 200 serves as a semi-reflective surface, and the remaining light flux is reflected to the secondary mirror 200a and the folded mirror 207 to be guided to the focal point detecting sensor 205. FIG. 14 and FIG. 15 are used to explain the pupil-splitting unit.

FIG. 15 is an exploded perspective view of the focal point detecting optical system. The focal point detecting optical system of the second embodiment includes a field lens 201, a viewing field mask 202, a pupil-splitting mask 203, secondary image forming lenses 204a and 204b, and a focal point detecting sensor 205. The field lens 201 functions to form an image in proximity to the exit pupil of the image-taking lens 18 that associates each of the opening portions of the pupil-splitting mask 203 with each of the ranging points. The viewing field mask 202 is provided in proximity to the expected image forming plane of the image-taking lens 5 and delimits the focal point detecting range. The pupil-splitting mask 203 includes diaphragm holes 203a and 204b and is provided on a side close to the image-taking lens 5 when viewed from the secondary image-forming lenses 204a and 204b. The diaphragm holes 203a and 204b delimit the light flux that is incident to the secondary image-taking lenses 204a and 204b. The position of the pupil-splitting mask 203 is set in relation to the position of the exit pupil of the image-taking lens 5 so as to form a substantial image due to the power of the field lens 201. The secondary image-forming lenses 204a and 204b form the subject image in an area that is determined by the view field mask 202 on the pair of light-receiving areas 206a and 206b that are provided at the focal point detecting sensor 205. The focus point detecting sensor 205 is a photoelectric converting unit that is provided with a pair of light receiving areas 206a and 206b. The subject image that reaches the light-receiving areas 206a and 206b of the focal point detecting sensor 205 undergoes photoelectric conversion, is read out as a pair of image signals, and this pair of image signals is used in the focal point detection calculation. By carrying out a correlation computation on the pair of image signals that has been obtained from the pair of light-receiving areas 206a and 206b described above, the defocus amount that corresponds to the ranging field can be obtained. In a focal point detecting optical system such as that of the second embodiment, when the light-receiving area of the focal point detecting sensor 205 is widened, complicated vignetting occurs at locations where the image height from the optical axis is high. Specifically, similar to the first embodiment, suitably finding the conversion coefficient is difficult.

Figure 16:
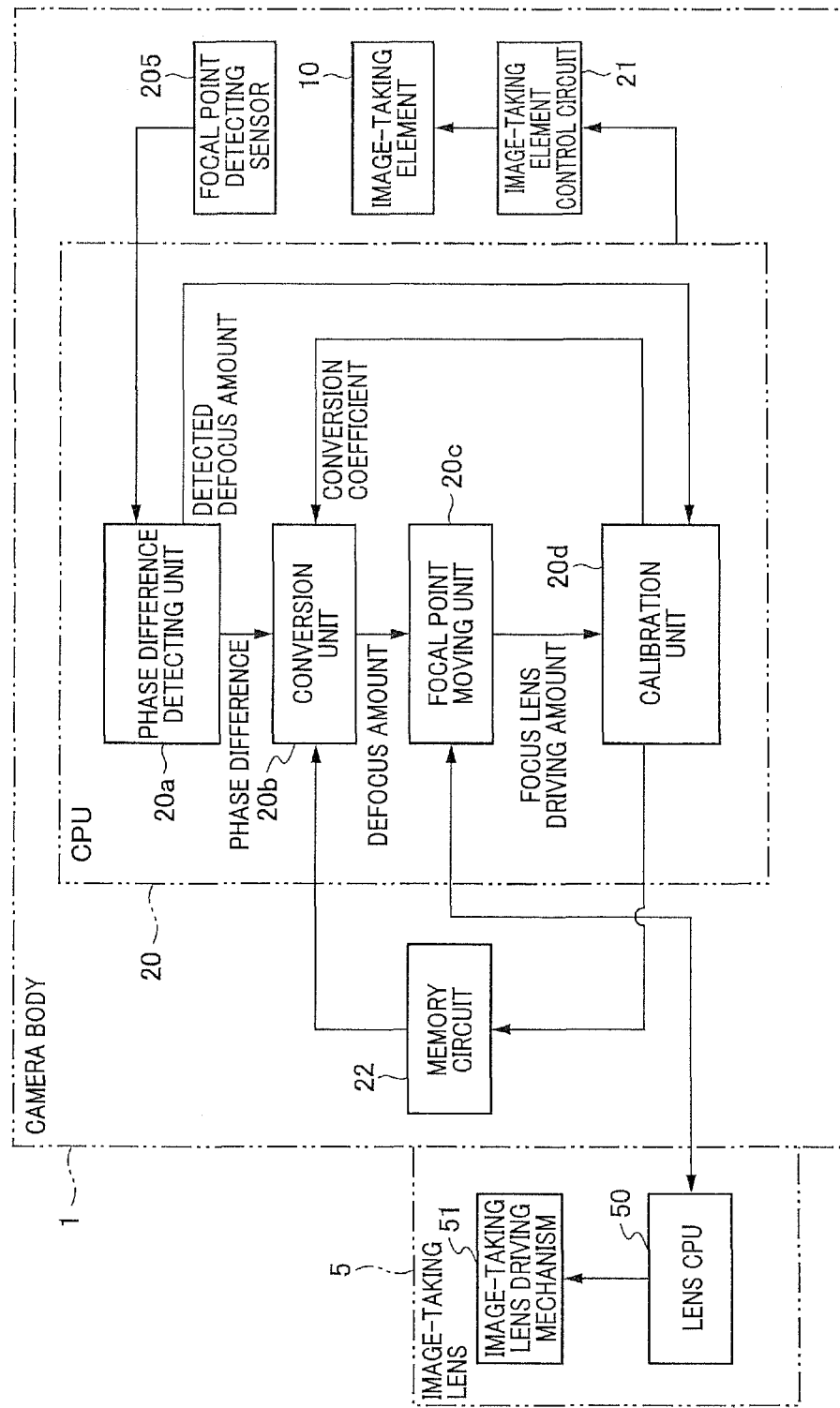
FIG. 16 is a functional block diagram of the portion related to the focus adjustment of the camera of a second embodiment.

FIG. 16 is a functional block diagram of the portion related to the focal point adjustment of the camera of the second embodiment. The phase difference detecting unit 20a of the second embodiment acquires a pair of image signals from the focal point detecting sensor 205 that serves as focal point detecting data. The other functional blocks are identical to those of FIG. 2 of the first embodiment.

Figure 17:
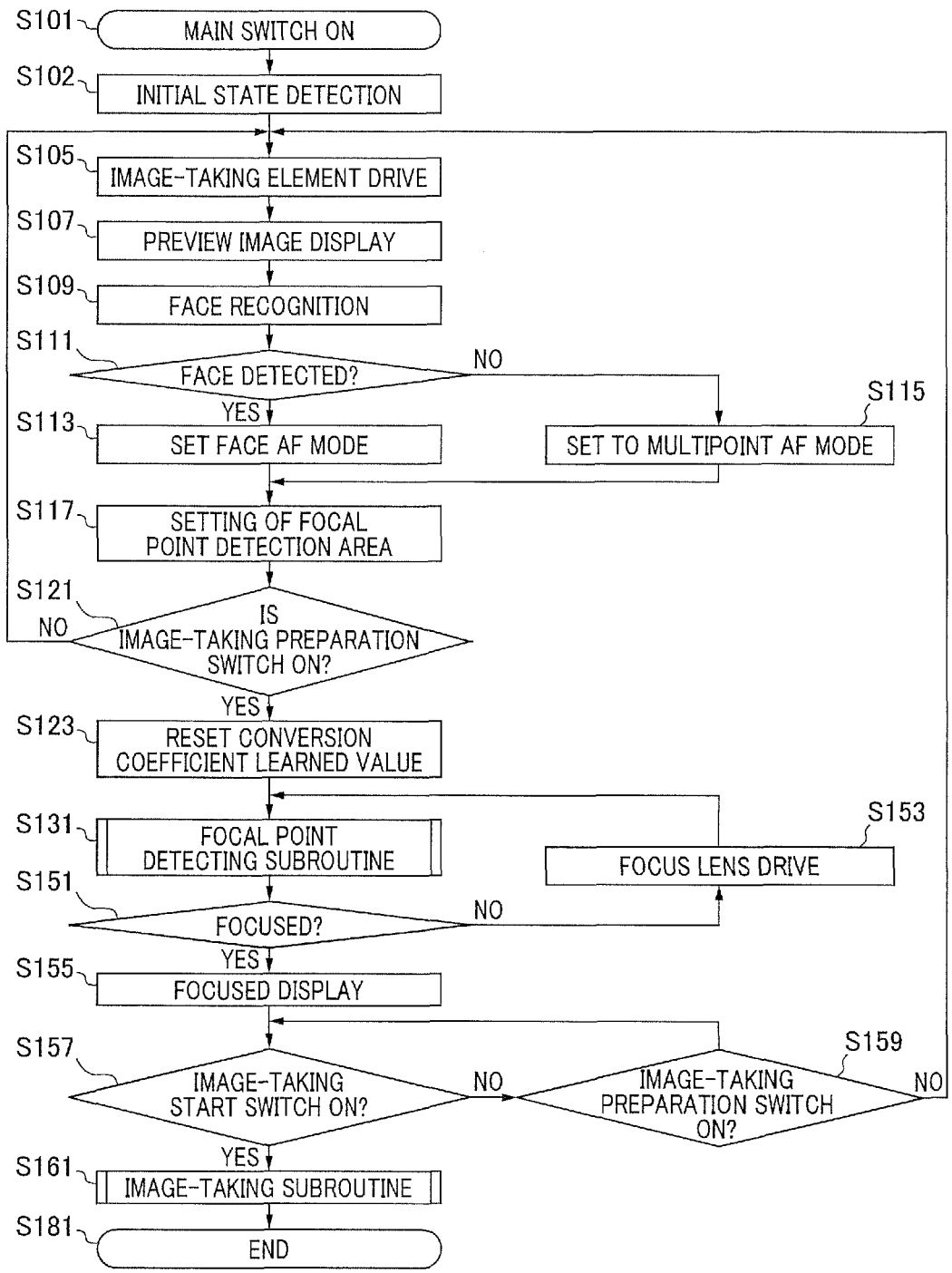
FIG. 17 is a flowchart of the focus detecting operation of a second embodiment.

FIG. 17 is a flowchart of the focal point detecting operation of the second embodiment. The focal point detecting subroutine, the conversion coefficient learning subroutine, and the image-taking subroutine carry out operations identical to those of the flowcharts in FIG. 9, FIG. 10, and FIG. 13, which are shown in first embodiment. In addition, in the flowchart that is shown in FIG. 16, reference numerals that are identical to those of the first embodiment are attached to steps that carry out identical operations in the second embodiment. Below, the points that differ from the first embodiment will be explained. The focal point detecting operation of the second embodiment differs from that of the first embodiment on the point that the operation corresponding to S103 and S104 in FIG. 8 of the first embodiment are not carried out. In the present embodiment, because the light flux is guided via a semi-transparent reflex mirror 200 to what is termed a "secondary image forming optical system", the mirror lockup operation and the shutter release operation are not necessary. In addition, in S163 in the image-taking subroutine, in the first embodiment, the shutter is restarted after being closed, whereas in contrast, in the present embodiment, the shutter is closed when S164 is reached, and thus a shutter start operation that is identical to that of a conventional film-based camera may be carried out. The other operations are identical to those of the first embodiment. As shown in FIG. 15, the focal point detecting sensor 205 that is shown in the present embodiment is a sensor in which the light-receiving area is not just at the center of the image plane, but also captures an image having an image height. The present invention can be easily applied to such a sensor. Specifically, a storing area that stores a conversion coefficient is prepared in the memory circuit 22 for a finite number of ranging points, and the learned value that is found in S223 may be stored in this storing area. In the present embodiment, even in a camera that uses a phase difference detecting method that uses what is known as a secondary image formation optical system, which is a conventionally widely used focal point detecting optical system, when an operator is carrying out normal photographic operations, the camera automatically carries out the calibration operation of the conversion coefficient. Thus, the calibration of the conversion coefficient, which converts a blur amount to a defocus amount, is carried out without the user being particular aware of the calibration operation, an improvement in the AF and an improvement in the AF precision can be realized. As a result, the convenience can be improved.

INDUSTRIAL APPLICABILITY

The above-described embodiments are not limiting, and various modifications and changes are possible within the range of the present embodiment.

In each of the embodiments, a digital still camera was explained as an example of an image-taking apparatus. However, this is not limiting, and, for example, the present invention may be applied to a video camera that is mainly for video photography.

In each of the embodiments, an example was provided in which the movement of the focal point position is carried out by driving the focus lens. However, this is not limiting, and any configuration may be used provided that the focal point position moves, for example, one in which the image-taking element side is moved or one in which both the focus lens and the image-taking element and the like are moved.

In each of the embodiments, an example was provided in which the present invention is applied to a camera as an image-taking apparatus. However, this is not limiting, and, for example, a configuration of the conversion coefficient calibrating program may be used whereby the conversion coefficient calibration method of the present invention is executed on a computer. Thereby, by updating the control program of the image-taking device, that is, by using what are known as firmware updates, this computer program can be used in an image-taking apparatus, and the calibration of the conversion coefficient in the phase difference detection can be carried out in existing image-taking apparatuses.

In each of the embodiments, an example was provided in which the calibrated conversion coefficients are stored in a memory circuit 22 of the camera body 1. However, this is not limiting, and the calibrated coefficients may be stored in a storing unit external to the camera body 1, for example, in a memory that is provided in the image-taking lens 5, which is an interchangeable lens.

Note that the first embodiment, the second embodiment, and the modifications can be used in suitable combinations, but the detailed explanation thereof has been omitted. In addition, the present invention is not limited by any of the embodiments that have been explained above.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-184020 filed Jul. 15, 2008 which are hereby incorporated by reference herein it their entirety.

The invention claimed is:

1. A focal point adjusting apparatus comprising:
a photoelectric converting unit that photoelectrically converts at least a pair of optical images and outputs at least a pair of image signals;
a phase difference detecting unit that detects the phase difference between the pair of image signals that is output by the photoelectric conversion unit;
a conversion unit that carries out the conversion of a phase difference that is detected by the phase difference detecting unit into a defocus amount by using a conversion coefficient;
a focal point moving unit that moves the focal point position based on the defocus amount resulting of the conversion by the conversion unit; and
a calibrating unit that calibrates the conversion coefficient depending on the result of the focal point moving unit moving the focal point position when the operator photographs a subject.

2. A focal point adjusting apparatus according to claim 1, wherein the calibration unit calibrates the conversion coefficient according to the result of the movement of the focal point position during the focusing operation that is carried out according to the commands of the operator.

3. A focal point adjusting apparatus according to claim 1, wherein the conversion coefficient is calibrated by comparing the amount of movement of the focal point position that has been expected by the focal point position moving unit and the amount of movement of the focal point position by which the focal point position has actually moved.

4. A focal point adjusting apparatus according to claim 3, wherein the calibration unit obtains the amount of movement of the focal point position that is expected by the focal point moving unit based on the amount of movement of a member that has actually moved when the focal point moves.

5. A focal point adjusting apparatus according to claim 1, wherein the calibrating unit stores the calibrated conversion coefficient in a storing unit that is provided in or externally to the focal point adjusting apparatus.

6. A focal point adjusting apparatus according to claim 1, wherein the calibration unit changes the operation in which the conversion coefficient is calibrated depending on the degree of agreement between a pair of optical images.

7. A focal point adjusting apparatus according to claim 1, wherein the calibration unit calibrates the conversion coefficient depending on the amount of movement of the focal point position by the focal point moving unit.

8. A focal point adjusting apparatus according to claim 1, wherein the calibration unit changes the operation in which the conversion coefficient is calibrated depending on the phase difference between the pair of image signals that are detected by the phase difference detecting unit.

9. A focal point adjusting apparatus according to claim 1, wherein the calibration unit calibrates the conversion coefficient after multiplying the calibration amount that has been found based on the results of the focal point moving unit moving the focal point position by a coefficient that has been determined as a numerical value from 0 to 1.

10. A focal point adjusting apparatus according to claim 1, wherein the calibration unit calibrates the conversion coefficient within a range in which the calibration value, which has been found based on the results of the focal point moving unit moving the focal point position, does not exceed a predetermined value.

11. A photographic apparatus comprising:
the focal point adjusting apparatus according to claim 1, and
an image-taking element that is provided at a position at which the focal point adjusting apparatus aligns the focal point.

12. An interchangeable lens that includes an image-taking optical system and that is freely detachable from the image-taking apparatus, comprising a storing unit that stores the conversion coefficients that have been calibrated by the focal point adjusting apparatus according to claim 1.

13. A conversion coefficient calibration method, comprising:
photoelectrically converting at least a pair of optical images and outputs at least a pair of image signals;
detecting a phase difference between the image signals;
carrying out the conversion of the phase difference into a defocus amount by using the conversion coefficient;
moving the focal point position based on the defocus amount that is the result of the conversion; and
calibrating the conversion coefficient according to the result of moving the focal point position.

14. A non-transitory computer readable storage medium that stores a conversion coefficient calibration program that causes a computer of a focal point adjusting apparatus, which is provided with a photoelectric converting unit that photoelectrically converts at least a pair of optical images and outputs at least a pair of image signals, to function as:
a phase difference detecting unit that detects a phase difference between the pair of image signals that are output by the photoelectric conversion unit;
a conversion unit that carries out the conversion of a phase difference that is detected by the phase difference detecting unit into a defocus amount by using a conversion coefficient;
a focal point moving unit that moves the focal point position based on the defocus amount resulting from the conversion by the conversion unit; and
a calibrating unit that calibrates the conversion coefficient depending on the result of the focal point moving unit moving the focal point position.

* * * * *